United States Patent [19]

Ogden

[11] Patent Number: 4,694,407
[45] Date of Patent: Sep. 15, 1987

[54] FRACTAL GENERATION, AS FOR VIDEO GRAPHIC DISPLAYS

[75] Inventor: Joan M. Ogden, Somerset County, N.J.

[73] Assignee: RCA Corporation, Princeton, N.J.

[21] Appl. No.: 743,623

[22] Filed: Jun. 11, 1985

[51] Int. Cl.[4] .................... G06F 15/336; G06F 15/66
[52] U.S. Cl. .................................... 364/518; 364/521; 364/728; 382/42; 340/747; 340/744
[58] Field of Search ............... 364/518, 521, 577, 578, 364/604, 728; 340/732, 744, 749, 747; 358/30, 138, 209; 382/9, 42

[56] References Cited

U.S. PATENT DOCUMENTS

| Re. 32,201 | 7/1986 | Bradley | 340/750 |
|---|---|---|---|
| 3,903,517 | 9/1975 | Hafner | 340/732 |
| 4,246,578 | 1/1981 | Kawasaki et al. | 340/750 |
| 4,263,593 | 4/1981 | Dagostino et al. | 340/747 |
| 4,559,605 | 12/1985 | Norsworthy | 364/604 |
| 4,580,135 | 4/1986 | Kummer et al. | 340/750 |
| 4,622,649 | 11/1986 | Lu | 364/728 |

OTHER PUBLICATIONS

"Fractal-Based Description of Natural Scenes", By: Alex Pentland, in I.E.E.E. Transactions on Pattern and Machine Intelligence, vol. PAMI-6, No. 6, Nov. 1984, pp. 661–674.

"Computer Rendering of Stochastic Models", By: Alain Fournier, et al., in Communications of the ACM, vol. 25, No. 6, Jun. 1982, pp. 371–384.

Primary Examiner—Errol A. Krass
Assistant Examiner—V. N. Trans
Attorney, Agent, or Firm—Allen LeRoy Limberg

[57] ABSTRACT

Fractals are generated based on their self-similarity properties. This is done by convolving a basic shape, or "generator pattern", with a "seed pattern" of dots, in each of different spatial scalings. The convolution results are then combined to define a multi-dimensional object, identifiable as a fractal. Two-dimensional sections of this object are used in generating graphic images for video display.

55 Claims, 15 Drawing Figures

FRACTAL GENERATION, AS FOR VIDEO GRAPHIC DISPLAYS

The invention relates to the more rapid calculation of a class of functions called fractals, particularly in regard to the computer generation of video graphic displays.

BACKGROUND OF THE INVENTION

Traditional mathematics has relied on idealized models of the complicated and irregular forms and physical processes of nature. These idealized models can be described in terms of continuous, differentiable functions and have no stastical basis involved in their generation. Graphics representative of clouds, mountains, coastlines, trees and the like are extremely difficult to describe in such terms. In his book *The Fractal Geometry of Nature* published by Freeman, San Francisco, in 1982 and included herein by reference, Benoit Mandelbrot describes in detail a new class of functions called fractals to express such irregular, fragmented natural forms.

A fractal function includes both the basic form inherent in a shape and the statistical or random properties of the placement of that shape in space. For example, a cloud may be drawn using overlapping circles. The circle is the basic shape, and the randomly determined size and position of the circles gives the cloud its natural look.

Fractals have the property of self-similarity as the spatial scale is changed over many orders of magnitude. As an example consider a rocky, very jagged coastline. The coastline looks similar seen from a jet airplane (a distance of 10 km), from a low altitude plane (100 m) and or from a standing position (1 m). A mountain is another example of a self-similar form. As the observer comes closer to a mountain, its subpeaks and hills resemble the whole. On a smaller scale the rock faces and clefts which make up the mountain have structure suggestive of the structure of the whole mountain. Considering the clouds, the coastline, or the mountain, one can discern that a basic form or "generator" is represented on multiple spatial scales from huge to minute.

Self-similar structures can have the randomness of a mountain or clouds or they can be geometrically defined and constructed in a more regular fashion. Self-similar structures with an infinite number of spatial scales can be built by starting with a desired structure or "initiator" and purposefully including a second structure, or "generator" at successively smaller spectral scales. The resulting fractal is termed a "teragon". Mandelbrot gives many examples of teragons, both regular and random.

The "usual topological dimension", $D_T$, is the intuitive Euclidean measure, a dot having $D_T=0$, a line having $D_T=1$, a plane having $D_T=2$, and a cube having $D_T=3$. The concept of dimension is generalized by Mandelbrot from the usual topological dimension $D_T$ to the Hausdorff, or fractal, dimension D which is suitable for measuring the complicated, sometimes infinitely long extent of a fractal structure. The "similarity dimension" can also be associated with fractal dimension. To paraphrase Mandelbrot's example with regard to this concept of dimension, consider again the rugged, indented coastline. To measure from a detailed map the length of the coast between two points, a straight measuring stick of length $\epsilon=10$ km to map scale, a certain distance $L=N\epsilon$ is measured. However, in using such a coarse measure, certain indentations of the coast must be passed over, and the measurement of L is too small. Measuring again with a stick of length $\epsilon=1$ km to map scale, the overall length L increases. As the length of the "measuring stick" shortens, measurements of the coastline can be made directly using surveying instruments, then actual measuring sticks, and then a microscope. As $\epsilon \to 0$, and each minute feature is measured, the overall length of the coast approaches infinity. The problem arises because L has been measured in one-dimensional units, $L(\epsilon)=N\epsilon^1$. If instead L is measured in units of $\epsilon^D$, where D is the fractal (Hausdorff) dimension, there is a number D, $(1<D<2)$, such that the measured length $L=N\epsilon^D$ is independent of the value of $\epsilon$. The fractal coastline lies somewhere between a series of connected straight segments, which could be measured unambiguously with a one dimensional measuring stick, and a space-filling two dimensional structure, where the usual two-dimensional area measure would be appropriate. The fractal dimension D is somewhere between one and two. A fractal is a structure whose Hausdorff dimension D exceeds its topological dimension $D_T$. The larger D is compared to $D_T$, the more convoluted, or "space-filling" or irregular the fractal.

The computer graphics community has recently been looking to fractal geometry as a way of synthesizing natural looking shapes and textures. Prior art fractal generation involves large amounts of computation, typically many minutes or even hours of computer time per image. In most of the simulations, a rule for creating the basic form is specified, and a random-walk-like statistical process is started. A large number of steps is performed, and a fractal image is the end product. An overview of the prior art usage of fractals in image synthesis is provided by Alex Pentland in his article "Fractal-Based Description of Natural Scenes" in *I.E.E.E. Transactions on Pattern and Machine Intelligence*, Vol. PAMI-6, No. 6, November, 1984, pp. 661–674. Another overview is provided by A. Fournier, D. Fussell, and L. Carpenter in their article "Computer Rendering of Stochastic Models" appearing on pages 371–384 of *Communications of the ACM*, Vol. 25, No. 6, June 1982. A less cumbersome way of generating fractals, which would allow their computation in shorter time is desirable. It is desirable that the method be one that can be implemented in digital hardware for generating fractals in real time at normal television scan rates.

The present invention centers around a new, vastly more efficient method for generating fractals, which method is in the nature of teragon construction. The method depends on an insight of the present inventor that the self-similarity property of fractals can be related to a self-similarity property that exists in inverse pyramid transforms.

Pyramid and inverse pyramid transforms are described, for example, by P. J. Burt in "The Pyramid as a Structure for Efficient Computation" in IPL-TR-038 published by the Image Processing Laboratory, Electrical and Systems Engineering Department, Rensselaer Polytechnic Institute, Troy, NY 12181. Inverse pyramid transforms are more specifically described by P. J. Burt and E. H. Adelson in "A Multiresolution Spline with Application to Image Mosaics", *ACM Transactions on Graphics*, Vol. 2, No. 4, October 1983, pp. 217–236.

The Burt pyramid transform is a spectrum analysis algorithm that separates a signal into spatial-frequency band-pass components, each approximately an octave wide in one or more dimensions and a remnant low-pass component. The band-pass components have successively lower center frequencies and successively less dense sampling in each dimension, each being halved from one band-pass component to the next lower. The remnant low-pass component may be sampled with the same density as the lowest band-pass component or may be sampled half so densely in each dimension. Processes that operate on the transform result components affect, on different scales, the reconstruction of signal in an inverse transform process. Processes operating on the lower-spatial-frequency, more-sparsely-sampled transform result components affect the reconstructed signal over a larger region than do processes operating on the higher-spatial frequency, more-densely-sampled transform result components. This comes about because of the nature of the inverse pyramid transform.

In the inverse pyramid process, the more-sparsely-sampled transform result components (as possibly modified) are expanded through interpolation to be sampled at the same density as the most-densely-sampled transform result. The expanded transform result components, now sampled at similar sampling density, are linearly combined by simple matrix summation. That is, there is a summing together of the expanded transform result components at each corresponding sample location in the most-densely-sampled sample space, which they share.

Because of associative and distributive properties in this expansion and linear combination process, this process is most efficiently carried out as follows. The most-sparsely-sampled transform result component is expanded to the same sampling density as the second-least-densely-sampled transform result component, then linearly combined with the second-least-densely-sampled transform result component, to obtain the linear combination of the two transform result components at the second-least-dense sampling periodicity. This linear combination of the two transform result components is expanded to the same sampling density as the third-least-densely-sampled transform result component and linearly combined therewith to obtain the linear combination of the three transform result components at the third-least-dense sampling periodicity. This successive stepwise expansion and linear combination continues until the linear combination of all the transform result components at the most-dense-sampling periodicity (the sampling periodicity of the highermost-octave transform result component) is obtained.

R. W. Schaefer and L. R. Rabiner describe a good way of performing interpolation of sample-data functions in their paper "A Digital Signal Processing Approach to Interpolation" appearing in *PROCEEDINGS OF THE IEEE* Vol. 61, No. 6, June 1973, pp. 692–702. Sparse sampling matrices have nulls inserted between sample data to develop denser sampling matrices, and the spurious harmonic frequencies generated by null insertion are removed by low-pass filtering.

SUMMARY OF THE INVENTION

The method of generating fractals in accordance with an aspect of the invention involves the defining of several sample data spaces ordinally numbered first through $n^{th}$ respectively representative of successively coarser sampling of an image space. A dot pattern (referred to as a "seed image") is generated in each sample data space. Each dot pattern may be random, semi-random or regular in nature; and it may resemble or differ from the dot pattern generated in the other sample spaces. The dot pattern may be devoid of dots in certain of the sample spaces. The seed image in each sample space is convolved with a "generator", a primitive image (such as a plane geometric form or an image derived from a video camera). The "generator" is the same for each sample space, though it may be rotated or somewhat differently sized as between sample spaces. The convolution results in the sample spaces ordinally numbered higher than first are expanded to the same sample density as the first sample space through interpolative processes and combined with the convolution results in the first sample space to generate the fractal. These interpolation and combination processes can be carried out most efficiently by taking advantage of associative and distributive properties in the process, analogously to calculation of inverse pyramid transforms.

Apparatus employing this method can generate fractals for display on a video monitor in accordance with a further aspect of the invention.

DETAILED DESCRIPTION

The method of generating fractals in accordance with the invention makes possible the real-time generation of video signals descriptive of graphic images based on fractals. The method will be described in the context of such a graphic image generator, but the method is also applicable for use in software for generating images in expanded time.

Figure 1:
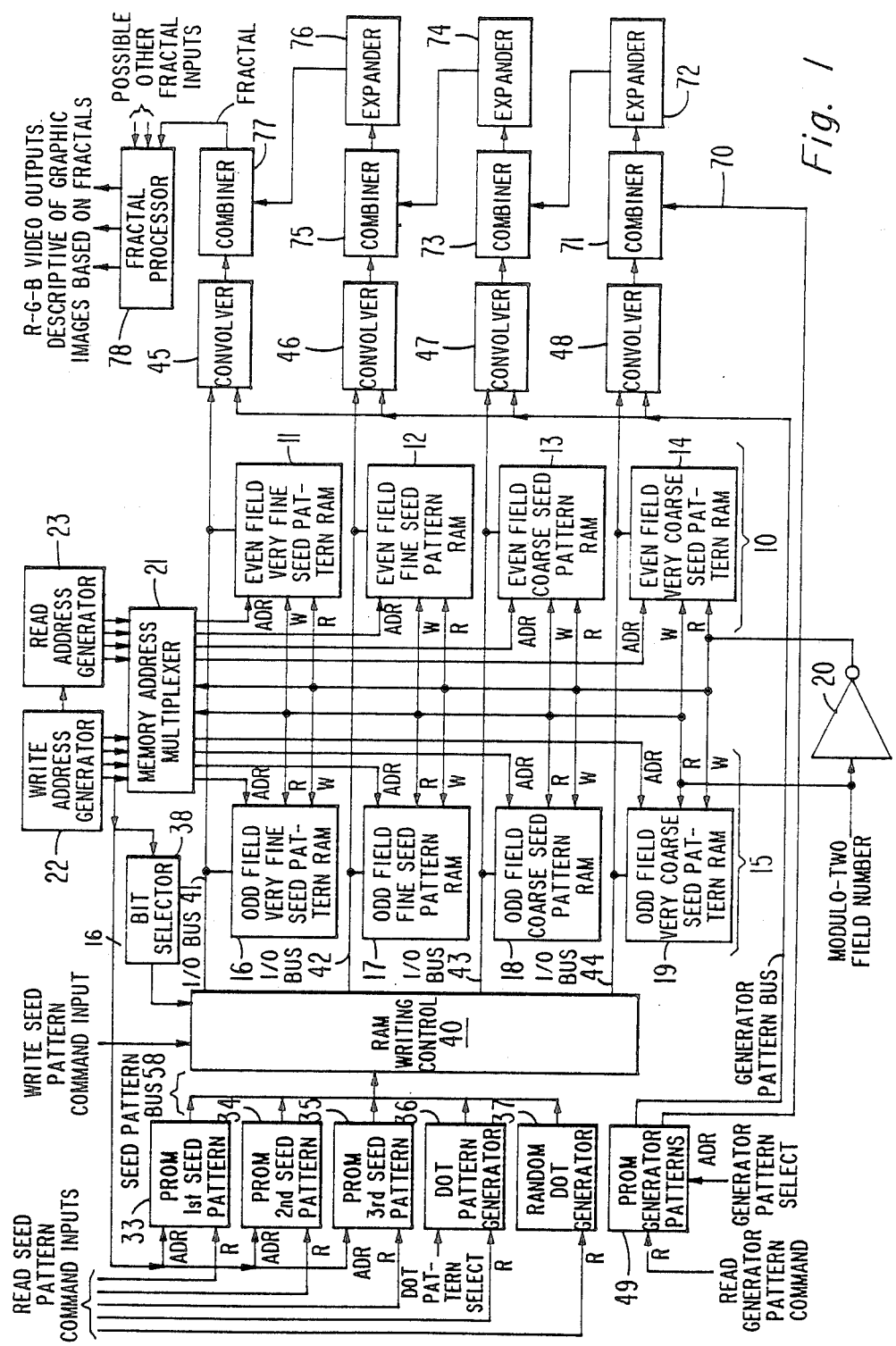
FIG. 1 is a block schematic diagram of a fractal generator embodying the invention.

FIG. 1 is an overall system diagram of apparatus for generating, in real time, video signal descriptive of any of a variety of graphic images based on fractals. In each successive television image field, a seed pattern of dots is convolved with a generator pattern in each of a succession of progressively less densely sampled sample-data spaces, to generate shapes on respectively larger scales. These shapes are than combined using an expansion and combination process. The convolutions are carried forward by sliding the seed patterns over the generator pattern. The sliding seed patterns are generated by scanning random-access-memory storing the seed patterns.

Successive image fields may be considered to be non-interlaced fields consecutively numbered in modulo-two numbers; modifications for field-to-field line or pixel interlace can readily be made by one skilled in the art of television system design. For the sake of simplicity $2^8$ lines per field and $2^8$ pixels per line will be assumed, with 1/60 second field rate. The modifications to conform to television standards used in broadcasting or to related graphic display video standards can readily be made by one skilled in the art of television system design.

A set 10 of RAMs 11, 12, 13 and 14 stores the seed patterns used for convolution in even-numbered alternate ones of the video image fields. RAM 11 has bit-map-organization vis-a-vis the video graphic image. That is, the storage locations in RAM 11 are addressed in integral values of orthogonal address coordinates that map each storage location to a particular picture element, or pixel, in the image generated in video signal form, as for presentation on a video monitor screen. RAM 11 has $2^{16}$ storage locations, with two hundred fifty-six row addresses corresponding to the $2^8$ lines per field, and with two hundred fifty-six column addresses corresponding to the $2^8$ pixels per line. RAM 11 stores a very fine, or ultra-high-resolution, seed pattern of dots, each dot having a corresponding row- and column-addressed storage location in RAM 11. RAM 12 has $2^{14}$ locations addressed by $2^7$ row addresses and $2^7$ column addresses. RAM 12 stores a fine, or high-resolution, seed pattern of dots, each dot having a corresponding row- and column-addressed location. Each storage location in RAM 12 maps a different $2 \times 2$ cluster of pixels in the video graphic image. RAM 13 has $2^{12}$ storage locations, and it stores a coarse, or low-resolution, seed pattern of dots. Each storage location in RAM 13 maps a different $4 \times 4$ cluster of pixels. RAM 14 has $2^{10}$ storage locations, and it stores a very coarse, still-lower-resolution, seed pattern of dots. Each storage location in RAM 14 maps a different $8 \times 8$ cluster of pixels.

A set 15 of RAMs 16, 17, 18 and 19 stores the seed patterns used for convolution in odd-numbered alternate ones of the video image fields. RAMs 16, 17, 18 and 19 of set 15 correspond respectively to RAMs 11, 12, 13 and 14 of set 10 in the way they map pixels and clusters of pixels in the video image.

Sets 10 and 15 of RAMs alternate being written in successive fields, and they alternate being read in successive fields. This procedure is followed for a number of reasons. The procedure allows accomodation for by the delays in the expansion and combination processes. The procedure facilitates animation of the graphic displays derived from fractal generation. The procedure facilitates the loading of new seed patterns into either set 10 or 15 of RAMs. To implement this procedure, the modulo-two field number is applied as a WRITE COMMAND signal to RAMs 11, 12, 13 and 14 and is applied as a READ COMMAND signal to RAMs 16, 17, 18 and 19. The commands are executed on a logic ONE condition. A logic inverter 20 complements the modulo-two field number. This complement is applied as a READ COMMAND signal to RAMs 11, 12, 13 and 14 and is applied as a WRITE COMMAND signal to RAMs 16, 17, 18 and 19. A memory address multiplexer 21 responds to the modulo-two field number or its complement or (as shown) both of them to select READ ADDRESS signals to the set 10 or 15 of RAMs being read from and to select WRITE ADDRESS signals to the set 10 or 15 of RAMs being written into.

Figure 2:
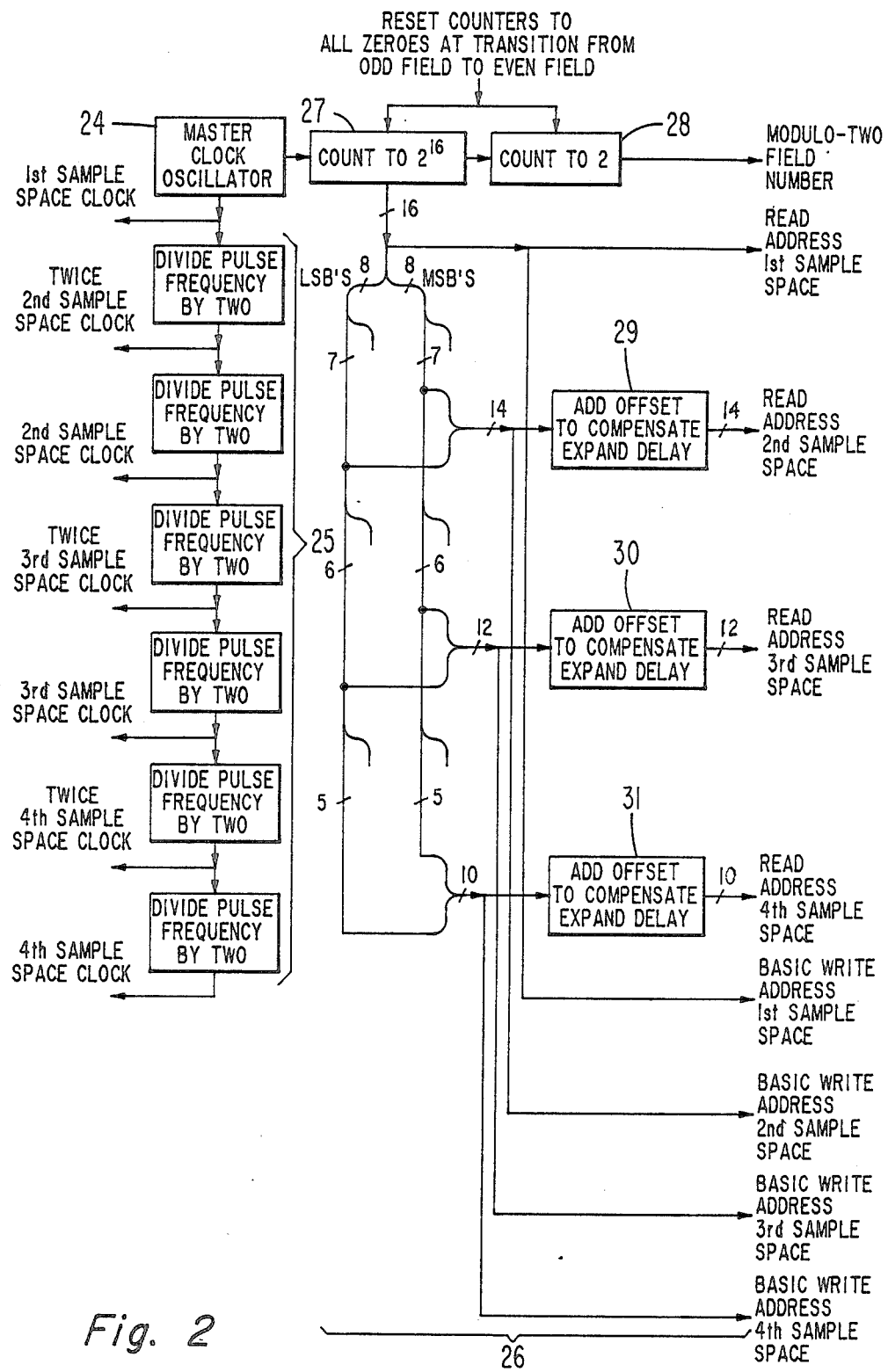
FIG. 2 is a block schematic diagram showing details of an address generator in the FIG. 1 fractal generator, for generating read addresses and basic write addresses.

A write address generator 22 generates BASIC WRITE ADDRESS signals supplied to a read address generator 23, which modifies them to generate the READ ADDRESS signals. These address generators 22 and 23 can include circuitry as shown in FIG. 2. A master clock oscillator 24 generates pulses at pixel scan rate which may be used as FIRST SAMPLE SPACE CLOCK signal. This signal is applied as input to a cascade 25 of circuits, each for dividing pulse rate by two, to generate successively a TWICE SECOND SAMPLE SPACE CLOCK signal, a SECOND SAMPLE SPACE CLOCK signal, a TWICE THIRD SAMPLE SPACE CLOCK signal, a THIRD SAMPLE SPACE CLOCK signal, a TWICE FOURTH SAMPLE SPACE CLOCK signal, and a FOURTH SAMPLE SPACE CLOCK signal. The generation of these clock signals is incidental to the generation of BASIC WRITE ADDRESS and READ ADDRESS signals per se.

The generation of these address signals takes place in circuitry 26. The pulses from master clock oscillator 24 are counted by a sixteen-stage binary counter 27 followed by a one-stage binary counter 28. All stages in counters 27 and 28 can be reset to ZERO at the transition between odd field and even field, to synchronize the fractal generator to the display apparatus and other display generation apparatus. The sixteen-place binary number generated by counter 27 is the raster-scanning BASIC WRITE ADDRESS signal in the first sample space and is also supplied as a READ ADDRESS SIGNAL to the one of RAMs 11 and 16 selected for reading. The eight more significant bits of counter 27 output signal are scan line numbers used as row addresses, and the eight less significant bits of counter 27 output signal are pixel numbers along scan line used as column addresses. Counter 28 output generates the modulo-two field number referred to earlier in the specification.

The choices of an integral power of two lines per field and of an integral power of two pixels per line allows the more significant bits and the less bits of counter 27 output signal to be used directly as row and column addresses for raster-scanning the storage locations of the one of RAMs 11 and 16 selected for reading, of course. Where other line numbering and pixel numbering schemes are employed, more complex arrangements will be required for dividing pixel count to obtain scan line and pixel position indications. The provision of such arrangements is a matter merely of design to one skilled in the art of television system and circuit design. Simplified raster scanning of RAMs 12, 13, 14, 17, 18 and 19 is also afforded by choosing the lines per field and pixels per scan line to be integral powers of two.

The raster scan rate for the one of RAMs 12 and 17 selected for reading is one-quarter that for the one of RAMs 11 and 16 selected for reading. The row addresses for the one of RAMs 12 and 17 selected for reading is obtained in part by discarding the least significant bit of the eight more significant bits of counter 27, to generate the row component of the BASIC WRITE ADDRESS signal for the second sample space. The column addresses for the one of RAMs 12 and 17 selected for reading is obtained in part by discarding the least significant bit of the eight less significant bits of counter 27, to generate the column component of the BASIC WRITE ADDRESS signal for the second sample space. The resulting fourteen-bit BASIC WRITE ADDRESS signal for the second sample space is supplied as input to an adder 29 with other input wired to add an offset. This offset compensates for the differential delay between the convolution result in the sample space defined by counter 27 output signal and the convolution result in the sample space defined by the fourteen-bit BASIC WRITE ADDRESS signal. (These adders 29, 30 and 31 actually subtract offsets, but subtraction is accomplished by addition that generates an overflow bit which is then discarded.) The fourteen-bit output signal of adder 29 is supplied as a READ ADDRESS to the one of RAMs 12 and 17 selected for reading. The seven more significant bits are used as row addressing; the seven less significant bits, as column addressing.

The raster scan rate for the one of RAMs 13 and 18 selected for reading is one-quarter that for the one of RAMs 12 and 17 selected for reading. The row addresses for the one of RAMs 13 and 18 selected for reading is obtained in part by discarding the two least significant bits of the eight more significant bits of counter 27 to generate the BASIC WRITE ADDRESS row component for the third sample space. The column addresses for the one of RAMs 13 and 18 selected for reading is obtained in part by discarding the two least significant bits of the eight less significant bits of counter 27, to generate the BASIC WRITE ADDRESS column component for the third sample space. The resulting twelve-bit BASIC WRITE ADDRESS signal for the third sample space is supplied as input to an adder 30 with other input wired to add an offset. This offset compensates for the differential delay between the convolution result in the sample space defined by counter 27 output signal and the convolution result in the sample space defined by the twelve-bit BASIC WRITE ADDRESS signal. The twelve-bit output signal of adder 30 is supplied as READ ADDRESS to the one of RAMs 13 and 18 selected for reading. The six more significant bits are used as row addressing; the six less significant bits, as column addressing.

The raster scan rate for the one of RAMs 14 and 19 selected for reading is one-quarter that for the one of RAMs 13 and 18 selected for reading. The row addresses for the one of RAMs 14 and 19 selected for reading is obtained in part by discarding the three least significant bit of the eight more significant bits of counter 27, to generate the BASIC WRITE ADDRESS signal row component for the fourth sample space. The column addresses for the one of RAMs 14 and 19 selected for reading is obtained in part by discarding the three least significant bit of the eight less significant bits of counter 27, to generate the BASIC WRITE ADDRESS signal column component for the fourth sample space. The resulting ten-bit BASIC WRITE ADDRESS signal for the fourth sample space is supplied as input to an adder 31 with other input wired to add an offset. This offset compensates for the differential delay between the convolution result in the sample space defined by counter 27 output signal and the convolution result in the sample space defined by the ten-bit BASIC WRITE ADDRESS signal. The ten-bit output signal of adder 31 is supplied as READ ADDRESS to the one of RAMs 14 and 19 selected for reading. The five more significant bits are used as row addressing; the five least significant bits, as column addressing.

It is convenient to have RAMs 11–14 and 16–19 store pixel elements for a field free of retrace intervals, this facilitates movement of the generated fractals in successive fields. That is, the image scan pattern may be considered to be a succession of scan lines with their endings connected back to their respective beginnings, to form circles ringing the surface of a circular cylinder, each circle defining the edge of a cross-section at right angles to the principal axis of the cylinder, distance along which axis may be considered to measure elapsed time in line scan units. Further, the cylinder may next be considered to wrap around on itself to form a toroidal surface thereby to define time in a modulo-elapsed fields scale, so the scan line rings define cross-sections of a torus. This image scan pattern allows the RAM's 11–14 and 16–19 to be continuously scrolled in the horizontal direction or in the vertical direction, without having to take into account the location of field retrace or line retrace intervals during the fractal generation process. Retrace intervals can be inserted later on, after the fractals are generated and processed to form video signal samples. This avoids the problems of having to deal with discontinuities at field edges.

Returning to FIG. 1 write address generator 22 generates the WRITE ADDRESS signals routed by multiplexer 21, which may or may not be the same as the BASIC WRITE ADDRESS signals supplied to read address generator 23. As will be discussed in detail further on, write address generator 22 generally allows selection among a variety of ways of generating WRITE ADDRESS signals. When the seed patterns are to be loaded into one of the sets 10 and 15 of RAMs, it is convenient to select the BASIC WRITE ADDRESS signals as the WRITE ADDRESS signals applied to this set of RAMs by memory address multiplexer 21. For now, assume this is done.

It is convenient to store often-used seed patterns in programmable read-only memories (PROMs) such as PROM 33, PROM 34 and PROM 35, so they can be called up responsive to READ ADDRESS signals. A PROM may store a seed pattern of dots in bit-map organization; this is preferable if the dot pattern is dense enough. A PROM may store a seed pattern of dots in a run-length-code format; this is preferable for sparse dot patterns. A PROM may be content addressable and store a seed pattern as a list of read address signals. It is convenient to store the very high resolution seed pattern as half a word in a PROM supplied with BASIC WRITE ADDRESS signals as its read addresses. The other half of the words spatially multiplex the lower resolution seed patterns, which the RAM writing control apparatus 40 sorts out responsive to selected bits in the BASIC WRITE ADDRESS signals as selected by a bit selector 38. A seed pattern may be generated by a dot pattern generator 36 or by a random dot generator 37 also. The seed pattern on which the generation of a fractal is to be based is determined responsive to a chosen READ SEED PATTERN COMMAND signal applied to a respective one of apparatuses 33–37.

Responsive to its receiving a WRITE SEED PATTERN command, RAM writing control apparatus 40 applies the selected seed pattern defined in four successively less densely sampled sample space matrices to input/output bus 41 shared by RAMs 11 and 16, to input/output bus 42 shared by RAMs 12 and 17, to input/output bus 43 shared by RAMs 13 and 18, and to input/output bus 44 shared by RAMs 14 and 19. (Cuts from one fractal-based image to the next will be through an intervening black field in the FIG. 1 fractal generator as described. Input/outut bus switching arrangements that allow a jump cut between fields are straightforward to implement, if desired.) The seed patterns are written into the set 10 or 15 of RAMs selected during that field for writing.

When the RAMS are loaded and the next field begins, a generator pattern is selected for convolution with the seed pattern in each of the four successively less densely sampled sample spaces. This generator pattern is to be maintained throughout the next field, while the one of the RAM sets 10 and 15 selected for reading has its storage locations scanned. Each of the RAMs 11 or 16, 12 or 17, 13 or 18, 14 or 19 selected for reading supplies one of the inputs to a respective convolver 45, 46, 47, 48. The other input for the convolvers 45–48 is the generator pattern. It is convenient to store the generator patterns in a parallel-access memory 49, from which an entire generator pattern can be accessed in parallel responsive to a single address and to a READ GENERATOR PATTERN COMMAND signal, so the memory outputs hold the generator pattern throughout the field scan of the set 10 or 15 of RAMS selected for reading to convolvers 45–48. Such "window-scanned" memory 49 can be constructed of banked PROMs, for example, using precepts described by L. A. Christopher et al. in their U.S. Pat. No. 4,460 958 issued 17 July 1984 and titled "WINDOW-SCANNED MEMORY". Convolvers 45–48 can be constructed without need for buffer memory after the set 10 or 15 of RAMs selected for reading and before the convolvers 44–48, as well, if the RAMs 11–14 and 16–14 are also of banked construction, so they too may be window-scanned. Assuming window-scanning of the memories supplying convolvers 45–48, consider now how each of these convolvers may be constructed.

Each convolution is presumed be between 3×3 sample matrices from generator pattern memory 49 and from one of the RAMs 11–14 or 16–19 selected for reading. The spatial matrix from generator pattern memory is presumed of the following form:

| A | B | C |
|---|---|---|
| D | E | F |
| G | H | I |

The spatial sample matrix from the RAM selected for reading is presumed of the following form:

| a | b | c |
|---|---|---|
| d | e | f |
| g | h | i |

In these matrices a, b, c, d, e, f, g, h, i, A, B, C, D, E, F, G, H, I are steady-state or quasi-steady-state variable. A "steady-state" variable does not change from field to field, a "quasi-steady-state" variable changes only between fields. The running product of these matrices is the convolution result. Convolution between 3×3 sample matrices is illustrated to minimize the complexity of the drawing. Convolution between 5×5, 7×7 or even larger sample matrics is as likely or more likely to be used in fractal generating apparatus embodying the invention.

Figure 3:
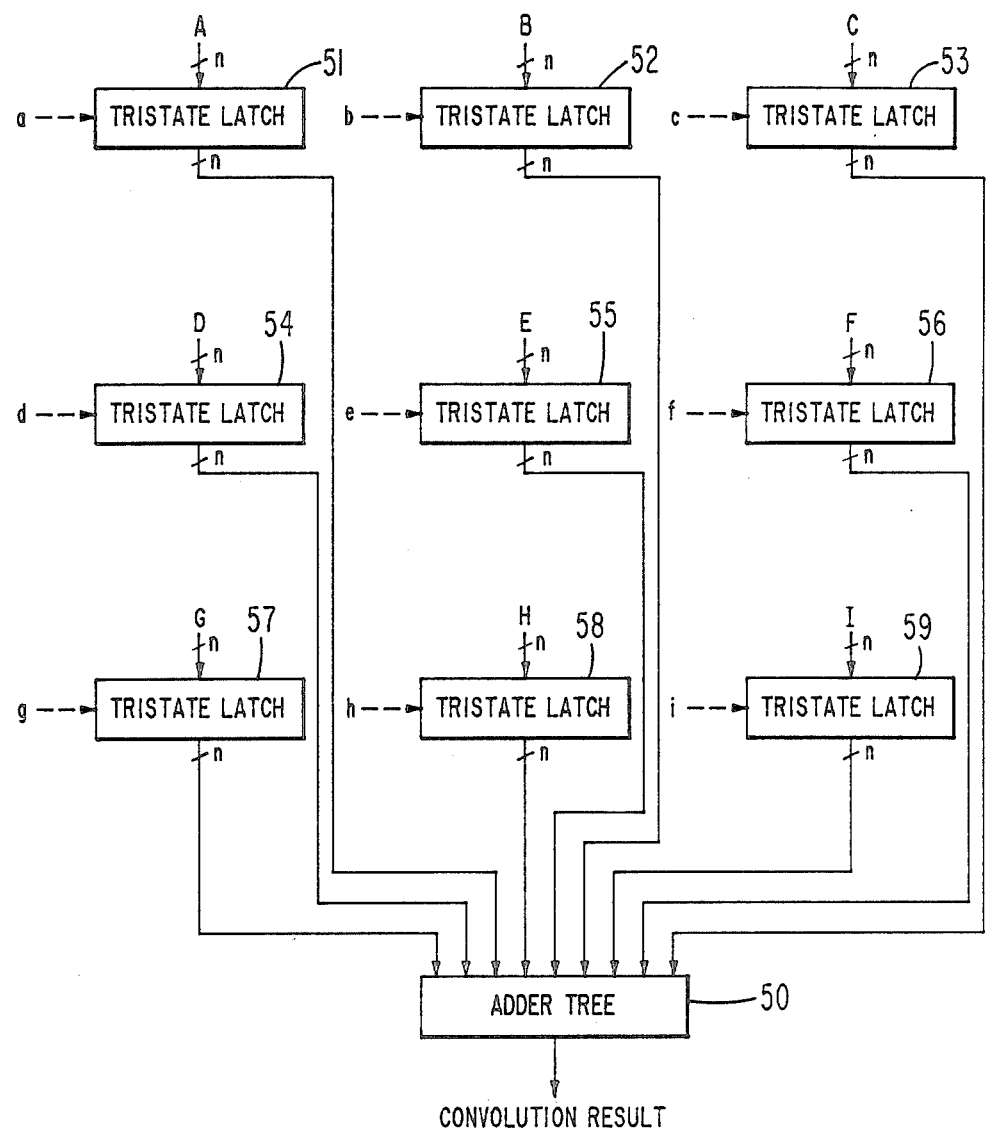
FIGS. 3 and 4 are block schematic diagrams of alternative forms each convolver in the FIG. 1 fractal generator may take.

FIG. 3 shows how each of the convolvers 45–48 can be constructed if the generator patterns drawn from memory 49 have n-bit gray scale and if the dot patterns drawn from the set 10 or 15 of RAMs selected for reading are one-bit in nature. An adder tree 50 receives nine component products of the matrix multiplication involved in the convolution process. A latch 51 comprising parallelled tri-states multiplies the n-bit variable A by one-bit variable a to generate the first component product of the matrix multiplication. Latches 52–59, each comprising parallelled tri-states, generate the component dots at mid position products A·a, B·b, C·c, D·d, E·e, F·f, G·g, H·h, and I·i respectively. The FIG. 3 convolver is attractive in that it "matches" with one-bit deep RAMs 11–14 and 16–19 and in that it avoids the need for fast digital multipliers capable of multiplying plural-bit numbers by plural-bit numbers. However, the number of bits in the matrix multiplication will be constrained to be no more than n+p, where p is the $\log_2$ of the number of component products in the matrix multiplication. The interpolative processes used after the convolvers 45–48 can add still further bits to the generated fractal. A large number of bits in the fractal, imparting higher resolution to the function, increases the possibilities of multiply thresholding the function. Multiple thresholding is an important technique for converting the fractal to usable graphic display, as will be treated in greater detail further on in this specification.

Figure 4:
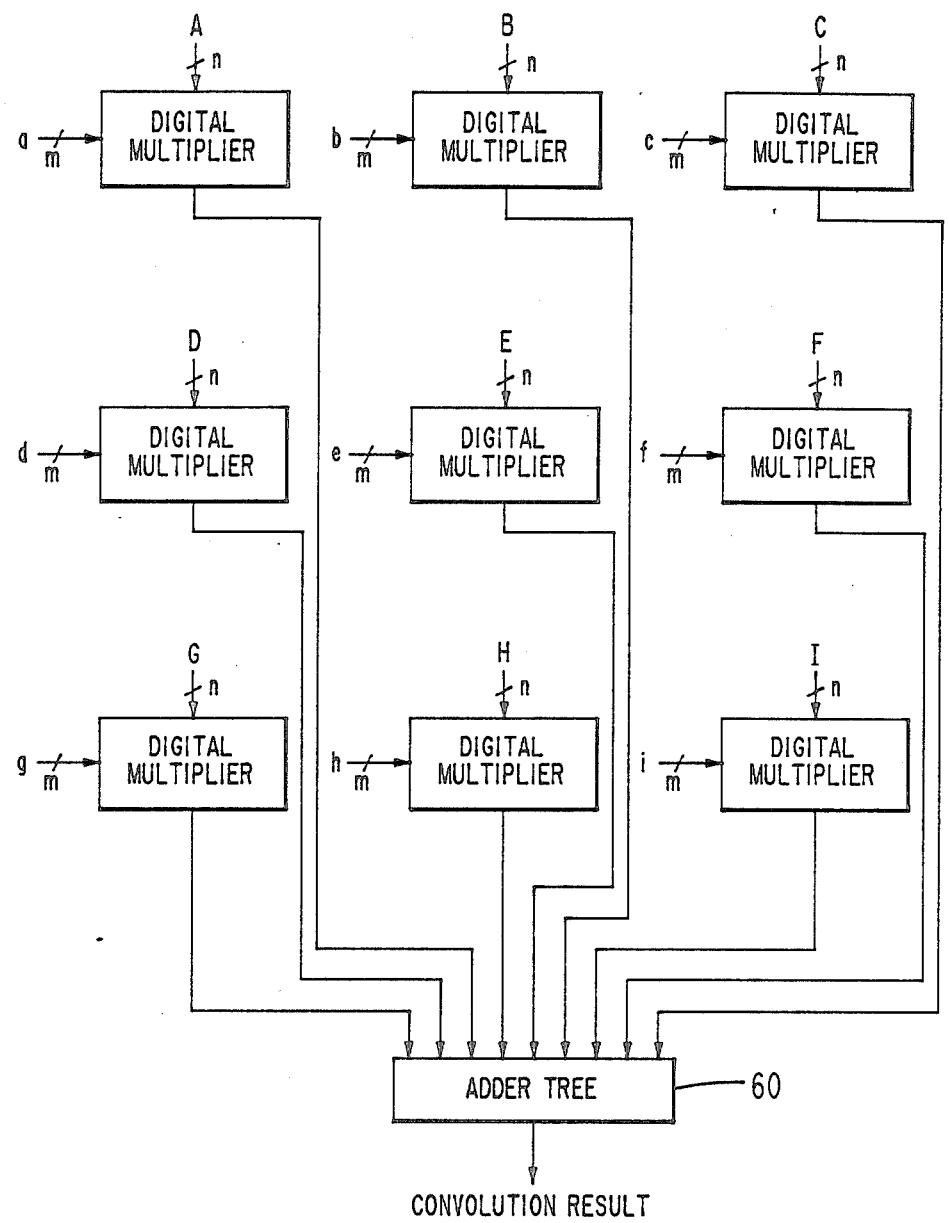

FIG. 4 shows the form each of the convolvers 45–48 may take when the designer of a fractal generator embodying the invention finds acceptable the costs of using fast digital multipliers and of making PROM, 31–33, RAMs 11–14 and RAMs 16–19 m bits deep, m bing a plural integer. Adder tree 50 is replaced by adder tree 60 which can accept (m+n)-bit inputs, and latches 51–59 are replaced by m-bit-by-n-bit digital multipliers 61–69 respectively. Each of the terms a, b, c, d, e, f, g, h and i will have m bits in this fractal generator.

One may also choose to design a simplified fractal generator by making both the seed pattern and generator pattern only one-bit deep. The matrix multiplications can then be carried out using a respective AND gate for generating each component product. The "products" from the AND gates are then continually summed to produce the correlation result. The interpolative processes, then, are the source of amplitude resolution in the generated fractal. One way of obtaining fractals with increased resolution, even when the fractal generation process is low-resolution in nature to begin with, is to multiply together a plurality of lesser resolution fractals independently generated using the same generator pattern and seed patterns that are spatially displaced respective to each other.

A way of reducing the hardware associated with convolvers 45–48, particularly where digital multiplication of m-bit by n-bit numbers is concerned, is to time-division multiplex the use of the digital multipliers. Since the clockthrough rate goes down by a factor of four in each sample space, this increases the rate of doing multiplication by less than 50%. Some data rate buffering is, of course, required before and after the digital multipliers where time division multiplexing them is done.

Another possible way of reducing the hardware associated with convolvers 45-48 is to take advantage of the property of self-similarity in the fractals. Initial portions of the convolution in the first, very-high-sampling-density sample space can be re-timed to the lower clock rates of the higher-ordinal-number, less-densely-sampled sample space. Retiming can be carried out, for example, using a series-in/parallel-out shift register to receive convolution results at high rate, and using a parallel-in/serial-out shift register to receive convolution results in parallel and issue them serially at reduced clock rate.

At this point in considering the operation of the FIG. 1 apparatus, the seed pattern in each of the successively more densely sampled sample spaces has been convolved with the generator pattern. The convolution results from convolvers 48, 47 and 46 are to be converted to sampling matrices of the same sampling density as the sample matrix in which the convolution results are provided from convolver 45, so that all the convolution results may be combined. The combined convolution results may be superposed on a dc pedestal. The dc pedestal can be supplied from the generator pattern PROM 49, for example, via bus 70 as shown in FIG. 1 and combined in combiner 71 with the convolver 48 convolution result. The combiner 71 output signal is expanded by interpolation in expander 72 to the same sampling density as the convolver 47 output signal, with which it is combined in combiner 73. The combiner 73 output signal is expanded by interpolation in expander 74 to the same sampling density as the convolver 46 output signal, with which it is combined in combiner 75. The combiner 75 output signal is expanded by interpolation in expander 76 to the same sampling density as convolver 45 output signal, with which it is combined in combiner 77.

The combiner 77 output signal is the generated fractal. It and possibly other fractals simultaneously generated by other fractal generators are supplied to a fractal processing apparatus 78, to be converted to a video signal descriptive of a graphic image to be displayed on a video monitor. Some of the fractal processing employed by the inventor will be described further on in this application, but consider now in greater detail how the expansion and combination processes are carried out.

Figure 5:
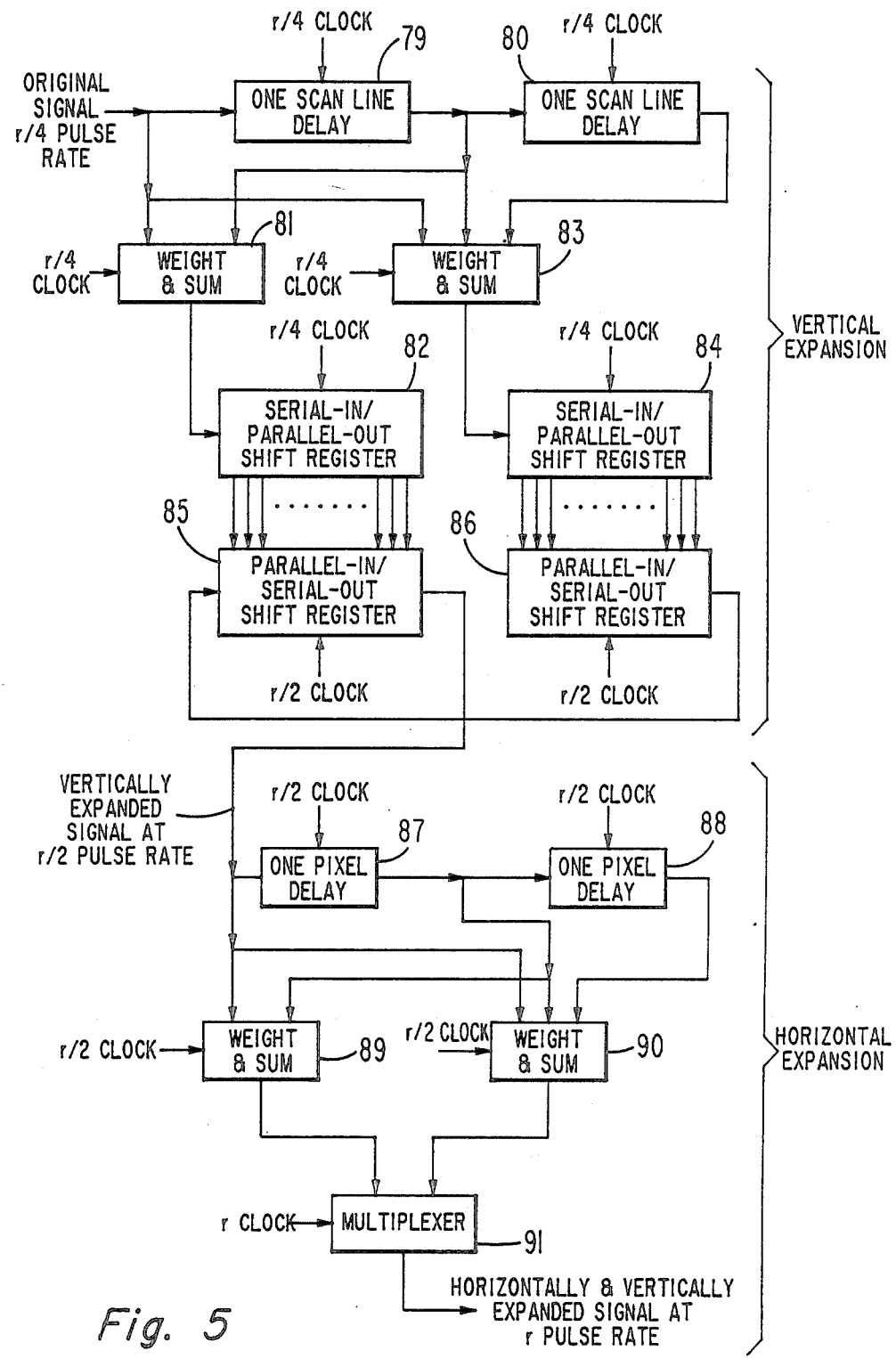
FIG. 5 is a block schematic diagram of the form each expander in the FIG. 1 fractal generator may take.

FIG. 5 shows one form the expander 72, 74 or 76 may take. The essential ideas of how the expansion of an original signal sampled at an original sampling density is carried out through two-dimensional linear interpolation, to generate a signal twice as densely sampled in each dimension, are as follows. First, there is expansion of the original signal in the direction perpendicular to line scan—i.e., vertical expansion. This is done by compressing the rows of samples in the less-densely-sampled sample space into alternate rows in a sample space with double the sampling density, interleaving the alternate rows of samples with alternate rows of nulls or zero-valued samples, then low-pass-filtering the result in the direction perpendicular to line scan by transversal filtering techniques.

Then, the low-pass filter response at twice original sampling density is subjected to expansion in the direction of line scan—i.e., horizontal expansion. This is done by alternating samples from the low-pass filter response with nulls to develop a signal at four times original sampling density, which is then low-pass filtered to yield the output signal. The output signal is the same as the original signal except for being sampled twice as densely in each dimension.

FIG. 5 shows the original sample sampled at a pulse rate r/4 being applied to cascaded clocked delay lines 79 and 80, each of which delay lines has a sufficient number of successive stages to store an entire scan line sampled at a density associated with the r/4 pulse rate. A five-tap, two-phase, finite-impulse-response, low-pass transversal spatial filter is to be used in filtering perpendicular to direction of line scan. A line of nulls, a line of undelayed original signal, another line of nulls, a line or original delayed by one line duration (at the sample density associated with the r/4 pulse rate, and a still further line of nulls are to be weighted and summed in one phase of the low-pass filter convolution. This is done in actuality by applying the original signal and the original signal delayed by one line duration, which appear respectively at the input and output of clocked delay line 79, as inputs to a weight and sum circuit 81. (The nulls cause no filter response and so do not need to be weighted and then added into the summation). The phase of filter response supplied from weight and sum circuit 81 is serially applied as an input signal clocked at r/4 clock rate into a serial-in/parallel-out shift register 82 with one scan line storage capacity. A line of undelayed original signal, a line of nulls, a line of original signal delayed by one line duration, a line of nulls, and a line of original signal delayed by two lines duration are to be weighted and summed in the other phase of the low-pass filter convolution. This is done by applying the original signal at the input of delay line 79, the original signal delayed by one line duration as appears at the interconnection between cascaded delay lines 79 and 80, and the original signal delayed by two lines duration as appears at the output of delay line 80 as inputs to a weight and sum circuit 83. The phase of filter response supplied from weight and sum circuit 83 is serially applied as an input signal clocked at r/4 clock rate into a serial-in/parallel-out shift register 84 with one scan line storage capacity.

At the end of each scan line duration at the r/4 clock rate, shift registers 82 and 84 are filled with samples. A shift signal is generated, which transfers the contents or register 82 in parallel to a parallel-in/serial-out shift register 86. Shift register 86 serial output connection is to a serial input connection of shift register 85. The two-successive lines of low-pass transversal filter response in shift registers 85 and 86 are shifted through shift registers 86 and 85 at r/2 clock rate to provide two scan lines of filter response in the time occupied by one line of original signal as supplied a r/4 clock rate. The samples serially supplied at r/2 clock rate from the output connection of shift register 85 is the original signal expanded to twice as dense sampling in the direction perpendicular to line scan.

As a first step in the process of expansion in the direction of line scan—i.e., horizontal expansion—this signal is applied to cascaded one-pixel delay stages 87 and 88 clocked at r/2 clock rate. These stages are part of a five-tap, two-phase, finite-impulse-response low-pass transversal spatial filter that filters in the direction of line scan. A null, undelayed vertically expanded signal, another null, vertically expanded signal delayed one pixel duration at r/2 clock rate, and a still further null are to be weighted and summed in one phase of filtering. This is done by applying the undelayed vertically expanded signal and that signal delayed by a pixel duration to a weight and sum circuit 89. Undelayed vertically expanded signal, a null, vertically expanded signal delayed by a pixel, a null, and vertically expanded signal delayed by two pixels are to be weighted and summed in the other phase of filtering. This is done by applying the undelayed vertically expanded signal and the output signals of clocked delay stages 87 and 88 to a weight and sum circuit 90. A multiplexer 91 clocked at the r clock rate re-samples the parallel streams of output signals of weight and sum circuits 89 and 90 into alternating sequential format, to supply horizontally-and-vertically-expanded signal at r pulse rate.

In expander 72 r/4, r/2 and r correspond respectively to FOURTH SAMPLE SPACE CLOCK, TWICE FOURTH SAMPLE SPACE CLOCK and THIRD SAMPLE SPACE CLOCK signals from the pulse frequency divider cascade 25 of FIG. 2. In expander 74 r/4, r/2 and r correspond respectively to THIRD SAMPLE SPACE CLOCK, TWICE THIRD SAMPLE SPACE CLOCK and SECOND SAMPLE SPACE CLOCK signals from the pulse frequency divider cascade 25. In expander 76 r/4, r/2 and r correspond respectively to SECOND SAMPLE SPACE CLOCK, TWICE SECOND SAMPLE SPACE CLOCK, and FIRST SAMPLE SPACE CLOCK signals.

Alternatively, expanders 72, 74 and 76 can take a different form than that shown in FIG. 5, one which uses random-access memory written at a relatively low rate and read severalfold at relatively high rate to supply samples for weighting and summation.

The signal combiners 71, 73, 75 and 77 deserve more detailed attention. In inverse pyramid transform image synthesis procedures adders respectively capable of handling either polarity of at least one input signal are used as linear combiners. One may use such adders for combiners 71–77 in the FIG. 1 fractal generator. One may also use subtractors for combiners 71–77.

The possibility of non-linear combiners 71–77 has been considered by the inventor, but not all non-linear combiners have the capability of generating useful fractals. Generally speaking, combiners which exhibit discontinuities in transfer function for either signal being combined are not suitable, unless those discontinuities are made to occur during times the signal that is subjected to the discontinuity is zero-valued. A combiner that raises both of its input signals to even powers of the input signals and sums the powers, for example, is not in the class of combiners found not to be suitable for fractal generators. Nor is a combiner that randomly adds or subtracts, so long as the switching between the two operations is mace when the addend/subtrahend input is zero-valued.

Figure 6:
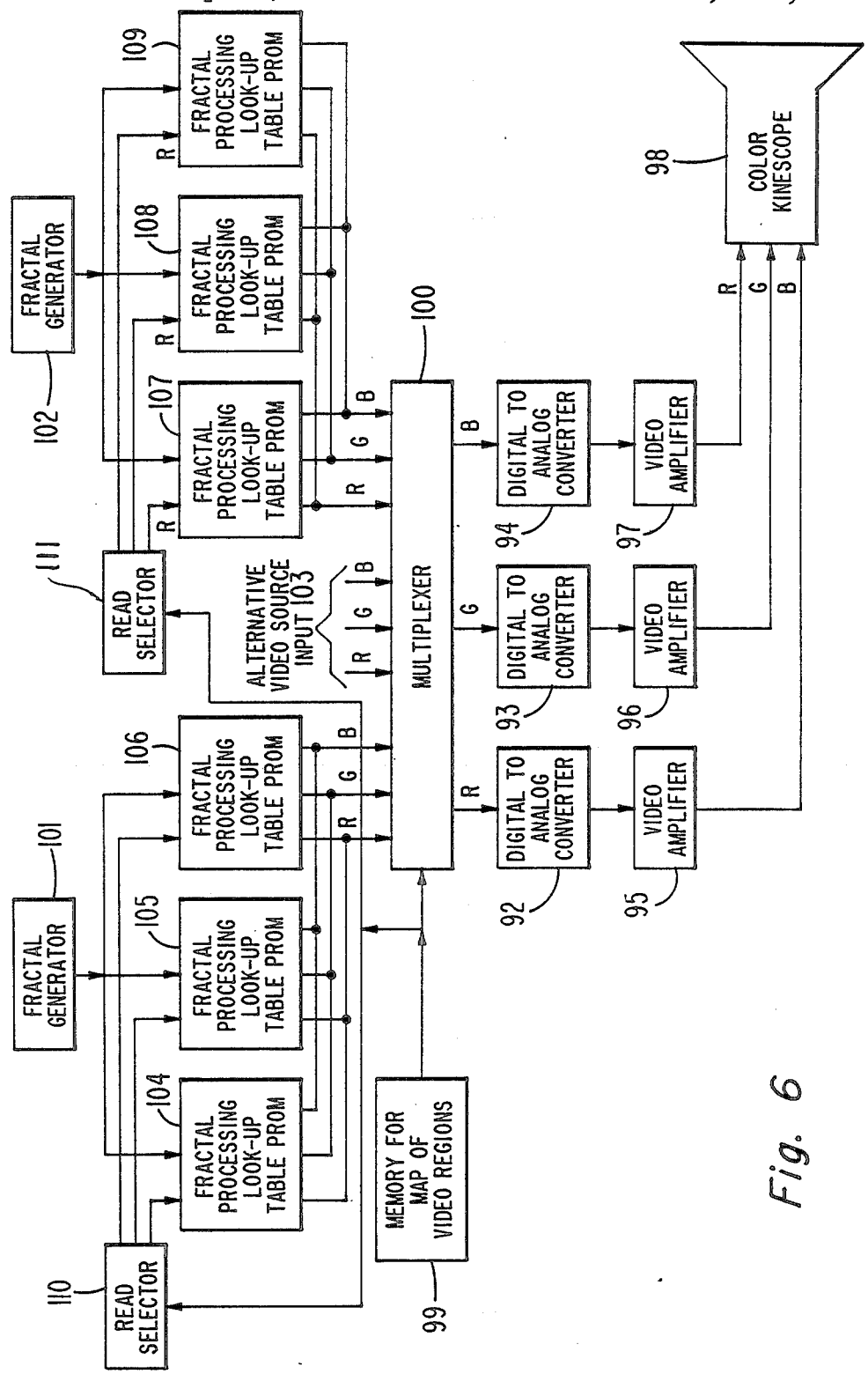
FIG. 6 is a block schematic diagram of a fractal processor, as can be used after the fractal generator of FIG. 1, to generate graphic images from the generated fractals.

FIG. 6 shows details of the fractal processor 78 shown in block in FIG. 1 and shows the connections of fractal processor 78 to a color video monitor. Fractal processor 78 supplies red (R), green (G) and blue (B) video signal samples to digital-to-analog converters 92, 93 and 94 respectively. D-to-A converters 92–94 may include video filtering. The R, G and B analog video signals from D-to-A converters 92, 93 and 94 are applied as input signals to video amplifiers 95, 96 and 97, respectively, the responses of which drive the red, green and blue guns of a color kinescope 98. (It is assumed that gamma correction is induced either in D-to-A converters 92, 93, 94 or in video amplifiers 95, 96 or 97). The deflection of color kinescope 98 (not shown) is synchronized to the field scan in the one of RAMs 11 and 16 selected for reading in the FIG. 1 fractal generator, and to the field scan of a memory 99 used to store a map of video regions.

Memory 99 stores retrace blanking patterns on a permanent basis. On a programmable basis it stores patterns of the regions in which a multiplexer 100 of R-G-B video signals will select, in place of blanking, video signals generated from output signal provided by a fractal generator 101 of the type described in connection with FIG. 1, video signals generated from another fractal generator 102, or any one (e.g. 103) of video signals from alternate video sources as may be available to supply multiplexer 100 video input signals. Memory 99 output is normally in the form of a binary code word. A sample code dictionary might be as follows.

| CODE | SELECTED VIDEO SIGNAL |
| --- | --- |
| 000 | Blank kinescope screen |
| 001 | Process fractal generator 101 output with PROM 104 |
| 010 | Process fractal generator 101 output with PROM 105 |
| 011 | Process fractal generator 101 output with PROM 106 |
| 100 | Process fractal generator 102 output with PROM 107 |
| 101 | Process fractal generator 102 output wth PROM 108 |
| 110 | Process fractal generator 102 output with PROM 109 |
| 111 | Choose alternate video source input 103 |

These codes are not only used by multiplexer 99. The codes are used by a read selector 110 which selects which one, if any, of the PROMs 104, 105, 106 is to be used to process the fractal generated by fractal generator 101. The codes are used by a read selector 111 which selects which one, if any, of the PROMs 107, 108, 109 is to be used to process the fractal generated by fractal generator 102.

Consider now what the relationship of one of the PROMs 104–109 is to the one of fractal generators 101 and 102 with which that PROM is used—e.g., the relationship of PROM 104 to fractal generator 101 when read selector 110 and multiplexer 100 select this processing combination to generate the R-G-B signals controlling the display on kinescope 98 screen. Fractal generator 101 supplies memory addresses to PROM 104. PROM 104 stores, for each of its possible addresses, amplitudes of R, G and B video signal samples. Suppose PROM 104 stored the fractal generator address as weighted by the relative weightings of R, G and B components in the luminance-only signal in the addressed location, for all addressable locations. PROM 104 would then send R-G-B signals to kinescope 98 causing it to reproduce the fractal in gamma-corrected gray scale terms.

Selecting PROM 105 to process fractal generator 101 output to R-G-B video, rather than PROM 104, would introduce another fractal processing algorithm. Another way to alter the fractal processing algorithm is to superpose it on another function of image space to generate the input addressing to the PROM used for fractal processing. For example a ramp function might be added to the fractal to change the size, luminance, or hue of the fractal generated shapes across the image field or from top to bottom of the image field.

In generating cloud patterns from a fractal generated from a circular or elliptic generator pattern in fractal generator 101, PROM 104 might be programmed to assign constant-luminance cyan-blue to all fractal values below mid-range to generate a blue sky background. The fractal values above mid-range might be programmed to assign a white color at luminance values directly dependent on the fractal value. This procedure generates a fractal boundary between clouds and blue sky background, establishing in what portions of the image field cloud patterns are to be found and in what portions of the image field blue sky background is to be found.

In effect, in this procedure, priority is established for the cloud patterns over the blue sky background in a montage of cloud patterns over the blue sky backgroun. Priority of an overlaying portion of fractal-generated foreground image over an underlying background image may be assigned similarly, even though the background image is more complex than a solid color field, in order to maintain a fractal boundary for the overlaying image portion. The lower levels of the fractal are designated transparent and are prevented from affecting display image. Conversely, a foreground graphic with non-fractal outline may be assigned priority over a fractal-generated background.

More complex prioritizing in more complex graphics is envisioned. For example, two sets of fractal generated cloud patterns in relatively large and relatively small scaling can be generated as foregound clouds and background clouds respectively. The foreground clouds can be assigned priority of display over the graphic image of an airplane. The foreground clouds and the airplane are made to have priority of display over the background clouds. The foregound clouds, the airplane, and the background clouds can be assigned priority of display over the sky beyond the background clouds. Cloud movements and airplane flight can be animated to fly the airplane through the cloudy sky on the video monitor display screen.

As another example, the superstructure of the graphic image of a boat may be given priority over both seascape generated from fractals and the overspanning sky also generated from fractals. The hull of the boat is assigned a priority that is always lower than the wavecaps of the sea, but is conditional with respect to other parts of the sea. Until the higher priority wavecaps have been reached during downward scan of the image field, the hull of the boat has higher priority than the lower-priority parts of the sea. This allows the waves to lap the hull of the boat. This general technique can be used with reversed direction of scan, followed by scan conversion, to achieve other effects.

One can also arrange for the seed patterns generating fractals to be affected by a non-fractal graphic image, so the thresholded fractals can have edges at desired points vis-a-vis the non-fractal image. One can make a boat plough through the waves of a seascape this way, for example. In the same vein, the FIG. 6 fractal process may be modified so that the memory 99 mapping video regions does not control multiplexer 100 directly, but instead supplies signal used in conjunction with priority codes accompanying multiplexer 100 input signals to determine the selection made by multiplexer 100.

A fractal boundary generated by comparing the fractal to a threshold value can be used to control the selection between two other video signals, so one of these video signals can be inset within the other with the boundary between them corresponding to the fractal boundary.

While the generation of R-G-B video signals for application to a monitor kinescope 98 has been specifically considered, these signals may be encoded for video recording and/or for television transmission. One may also arrange for the fractal processing to generate directly the luminance and chrominance components of a composite video signal for television transmission.

Consider now the apparatus for generating graphic images thusfar described. In a sound or video synthesizer it is important that the variability of results comes about according to rather well defined rules, so there is reasonable prediction of artistic success, and so the artist can "feel" his way toward a preconceived type of result. It is important that the results found by the artist to be desirable are reproducible. The "recipes" for these desired results can then be stored, and catalogued to be called up later on demand. In the apparatus thusfar described a feeling for the general shapes involved allows the selection of a generator pattern for entry into PROM 49. A feeling for generally how busy shape replication is at different scales allows one to select the density of dots in the various seed patterns. A feeling for the structure or non-structure of shape replication translates into a more regular or less regular dot structure in the seed pattern. Clumping up of the fractal into selected areas of the screen can be arranged by concentrating dots in the corresponding portions of the seed pattern. A feeling for the dynamic range or degree of compression as between fractal and displayed video controls programming of the fractal processor 78 PROMs. Color pallette selection also controls their programming. One skilled in the art of digital design for processing video can readily appreciate that programming aids for these programming tasks can be developed in hardware, firmware, software or combinations of them to make the feeling of artistic control still more effortless and natural.

One should understand the important role the seed pattern has in the invention. A concentration of dots in a first portion of the seed pattern and an absence of dots in a second portion of the seed pattern will generate a fractal with greatest intensity in the portion of image space corresponding to the first portion of its seed pattern, and thresholding the fractal will generate a fractal boundary between the first portion of image space and the remaining image space in the processed fractal. When processed fractals are assigned priority of display, these fractal boundaries appear in the finally displayed image, to create edges like those appearing in nature.

The predictability of regenerating artistically desirable fractals, though shape placement at each scaling be random, comes about in the invention through the use of the seed pattern. Although there can be a great degree of randomness in the seed pattern, this random pattern can be recreated at the operator's will, exactly, from one of PROMs 33–35, if need be. The convolution of this particular pattern with a particular generator pattern generates a predictable convolution result. Even when the seed pattern is altered from field to field to animate the fractal on the kinescope 98 display screen, as will be described further on in this specification, the succession of convolution results can be predicted as closely as one desires to. The specific information as to generator pattern (or basic shape) placement which is contained in the seed pattern implements operating fractal generators in parallel with predictable results. It also facilitates the manipulation of the seed pattern responsive to elements of the display other than the fractal being generated, which is of particular interest in animated display sequences. In the boat ploughing through waves, for example, dots can be seeded more heavily in the seed pattern at locations corresponding to the prow of the boat to raise the level of the waves there respective to the stern.

While fractal generators 101 and 102 may be operated independently of each other and their fractal processing may be independent of each other, many more sophisticated results can be obtained by operating fractal generators in league. Separate fractal generators using related generator and seed patterns can be used for respective colors, for example, in a plural color pallette. Following, a number of other examples are given.

A plurality of fractal generators may use the same seed patterns but different generator patterns. These generator patterns may be components of a more complex generator pattern. A circular generator pattern, for example, can be dissected into component circular arcs to be used respectively as generator patterns in the various fractal generators. The fractal generators generate component fractals of a complex fractal. The components of this complex fractal are then colored or brightened differently by respective PROMs in the fractal processor and the results combined in R-G-B form.

A plurality of fractal generators may use the same generator pattern and the same seed pattern in less densely sampled space(s), but different seed patterns in more densely sampled spaces to generate complex fractals. Different combiners can be used in the fractal generators, for the more densely sampled spaces.

A set of fractal generators operated with the same generator patterns and the same seed patterns except for offsets between them can generate complex fractals that can be compared in amplitude to generate edge information for shading purposes. Based on this disclosure one can foresee a large class of fractal processing techniques being developed based on complex fractal functions.

Thus far, consideration has been given principally to the generation of still pictures from the fractal generator and fractal processor combination. Consider now how the graphic images generated by fractals may be animated. A basic way to provide animation in the FIG. 1 apparatus is to introduce additional modifications as between the READ ADDRESS signals, applied to the set 10 or 15 of RAMs being read from, and the WRITE ADDRESS signals, applied to the other set of RAMs that is being written into. On the subsequent field scan of this other set of RAMs, as they are read out during raster scanning by READ ADDRESS signals, there will be movement in the fractals and in the kinescope 98 display derived from them.

Figure 7:
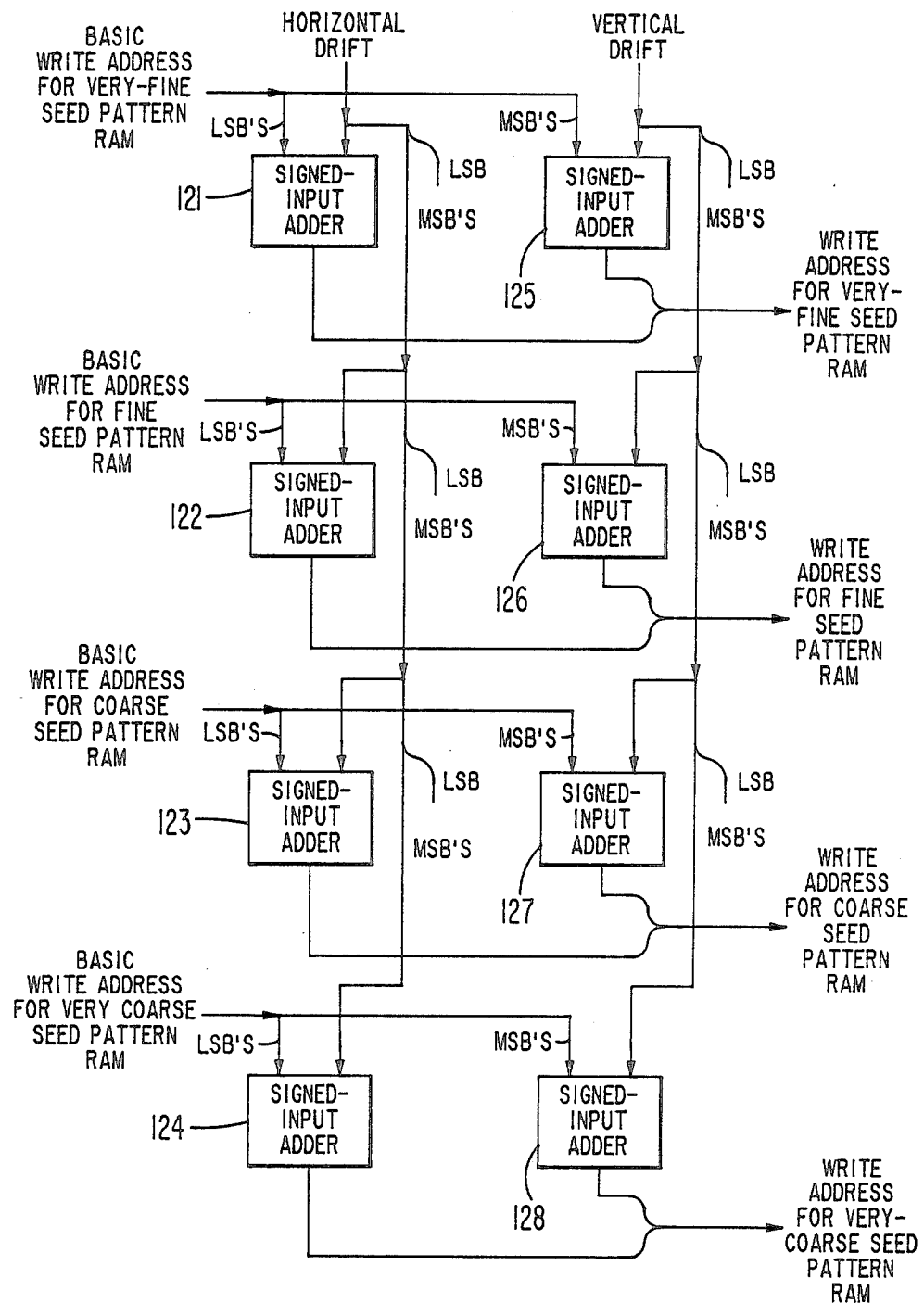
FIG. 7 is a block schematic diagram of a write address generator for the FIG. 1 fractal generator to provide for translatory or drift movements in the graphic images generated from the fractals.

FIG. 7 shows a write address generator for the FIG. 1 fractal generator, which write address generator causes a fractal-generated display to translate across screen. A HORIZONTAL DRIFT variable offset is applied in appropriate scaling to be added to or subtracted from the least significant bits of the BASIC WRITE ADDRESS signals in adders 121, 122, 123 and 124 to generate the horizontal-scanning column-address portions of the WRITE ADDRESS signals. A VERTICAL DRIFT variable offset is applied in appropriate scaling to be added to or subtracted from the more significant bits of the BASIC WRITE ADDRESS signals in adders 125, 126, 127 and 128 to generate the vertical-scanning row-address portions of the WRITE ADDRESS signals. Vertical drift rate depends on the value of VERTICAL DRIFT offset variable. Zero VERTICAL DRIFT variable maintains display stationary in the vertical sense. Positive VERTICAL DRIFT offset scrolls the display upwards, assuming scan lines are consecutively numbered from top to bottom of the display screen. Negative VERTICAL DRIFT offset scrolls the display downwards. Horizontal drift rate depends on the HORIZONTAL DRIFT offset variable. Positive HORIZONTAL DRIFT offset variable scrolls the display to the left, assuming pixels are numbered consecutively left to right; negative HORIZONTAL DRIFT offset variable scrolls the display to the left. Drift rate is limited to a fraction of display screen width per field in order to avoid step discontinuities in line trace appearing in the display. One may get around this limitation, however, if one desires. To do this the read address generator 23 is modified, with regard to resetting of the counter 27, and with regard to the carry from the eight less significant bit stages to the eight more significant bit stages.

Figure 8:
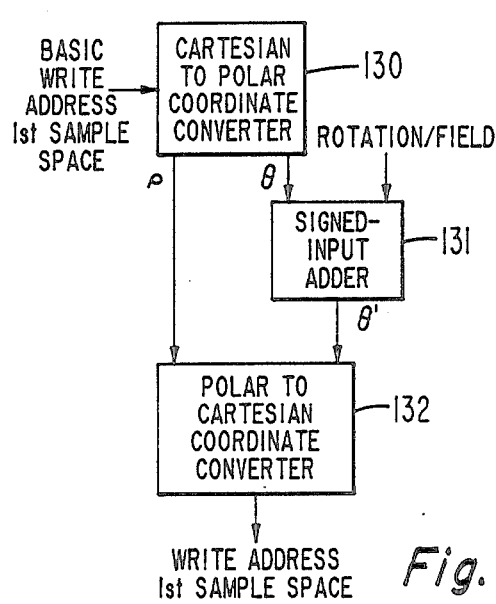
FIG. 8 is a block schematic diagram of a write address generator to provide rotational movements in the graphic images generated from the fractals.

FIG. 8 shows one type of circuitry for rotating the fractal-based display on the kinescope 98 display screen. The BASIC WRITE ADDRESS signals generated in Cartesian coordinates by address generation circuitry 26 are supplied to a Cartesian-to-polar coordinate converter 130, which converts the bit-map addresses to polar coordinates. These polar coordinates, which appear in a stream, each comprise a respective radial coordinate $\rho$ and respective angular coordinate $\theta$. The angular coordinate $\theta$ is supplied to one input of an adder 31 to have a ROTATION PER FIELD offset added to it or subtracted from it. The modified angular coordinate $\theta'$ supplied from adder 31 output connection and the radial component $\phi$ are applied to a polar-to-Cartesian coordinate converter 132 to be converted into Cartesian coordinate WRITE ADDRESS signals. Coordinate converters 130 and 132 may each be implemented by read-only-memory ROM look-up tables. Accumulation techniques are also known for performing such conversions. Techniques for raster rotation that perform Cartesian-coordinate-to-rotated-Cartesian-coordinate conversions are known in connection with phantom raster scanning of bit-map-organized memories; these may be adapted to rotating the BASIC WRITE ADDRESS signal raster scan to obtain a WRITE ADDRESS signal raster scan in other implementations of this aspect of the present invention.

Figure 9:
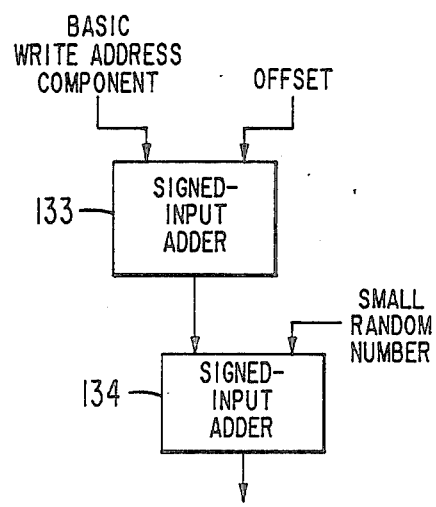
FIG. 9 is a block schematic diagram of a modification for the FIG. 8 or FIG. 9 write address generator to provide randomness in the movements of the graphic images generated from the fractals.

FIG. 9 shows a modification that can be made to the FIG. 7 and FIG. 8 apparatuses so that drift or rotation is not uniform over the entire field. Cascaded adders 133 and 134 modify a BASIC WRITE ADDRESS, not only by adding or subtracting a fixed offset in adder 133, but also by adding or subtracting a small random number in adder 134. Such an adder cascade may replace adder 131 in FIG. 8, for example. Such adder cascades may replace each of the adders 121–128 in FIG. 7. The random numbers for use in the FIG. 9 apparatus may be randomly generated, by regularly performing analog-to-digital conversion of white noise, for example. But sequences of random movement can be made predictable by selecting the random numbers in prescribed sequence from a random number look-up table memory. The random numbers are then not truly random, but quasi-random or apparently random in nature.

Figure 10:
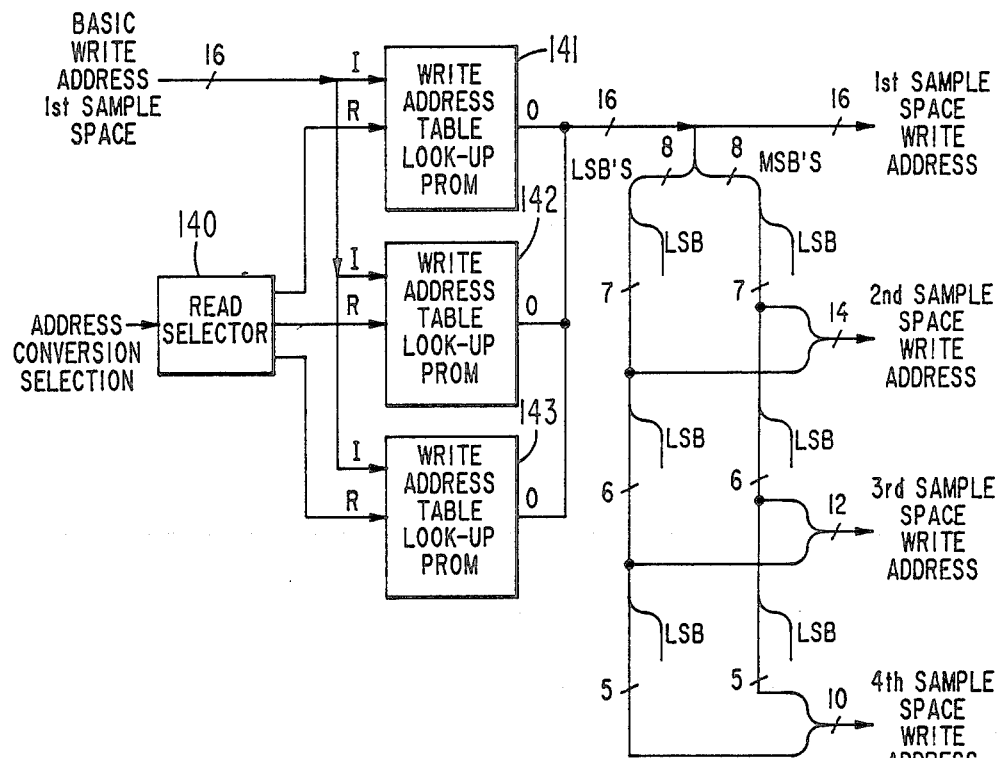
FIG. 10 is a block schematic diagram of a write address generator to provide selectively more complex movements in the graphic images generated from the fractals.

FIG. 10 shows how motions more complex than field drift or field rotation may be introduced into the image display generated for on kinescope 98 display screen. Sixteen-bit BASIC WRITE ADDRESS or READ ADDRESS signals are applied as addresses to a plurality of WRITE ADDRESS table-look up memories (e.g., 141, 142, 143) which can be PROM's. Responsive to an ADDRESS CONVERSION SELECTION command, a read selector 140 selects one of these WRITE ADDRESS look-up memories for reading to supply the sixteen-bit WRITE ADDRESS signals for the first, most-densely-sampled sample space. These are broken down as the sixteen-bit BASIC WRITE ADDRESS signals for that sample space were in address generation circuitry 26 of FIG. 2, to provide WRITE ADDRESS signals for the other, less-densely-sampled sample spaces. Examples of field motions that can be implemented by the FIG. 10 apparatus are:

(1) a wellspring or source function, where the graphic image increases in size as it flows outward from a source point towards the edges of image field;

(2) a drain function, where the graphic image decreases in size as it flows from the edges of image field into a drain point in the image field;

(3) the well spring function combined with rotation around the source point; and (4) the drain function combined with rotation around the drain point.

Figure 11:
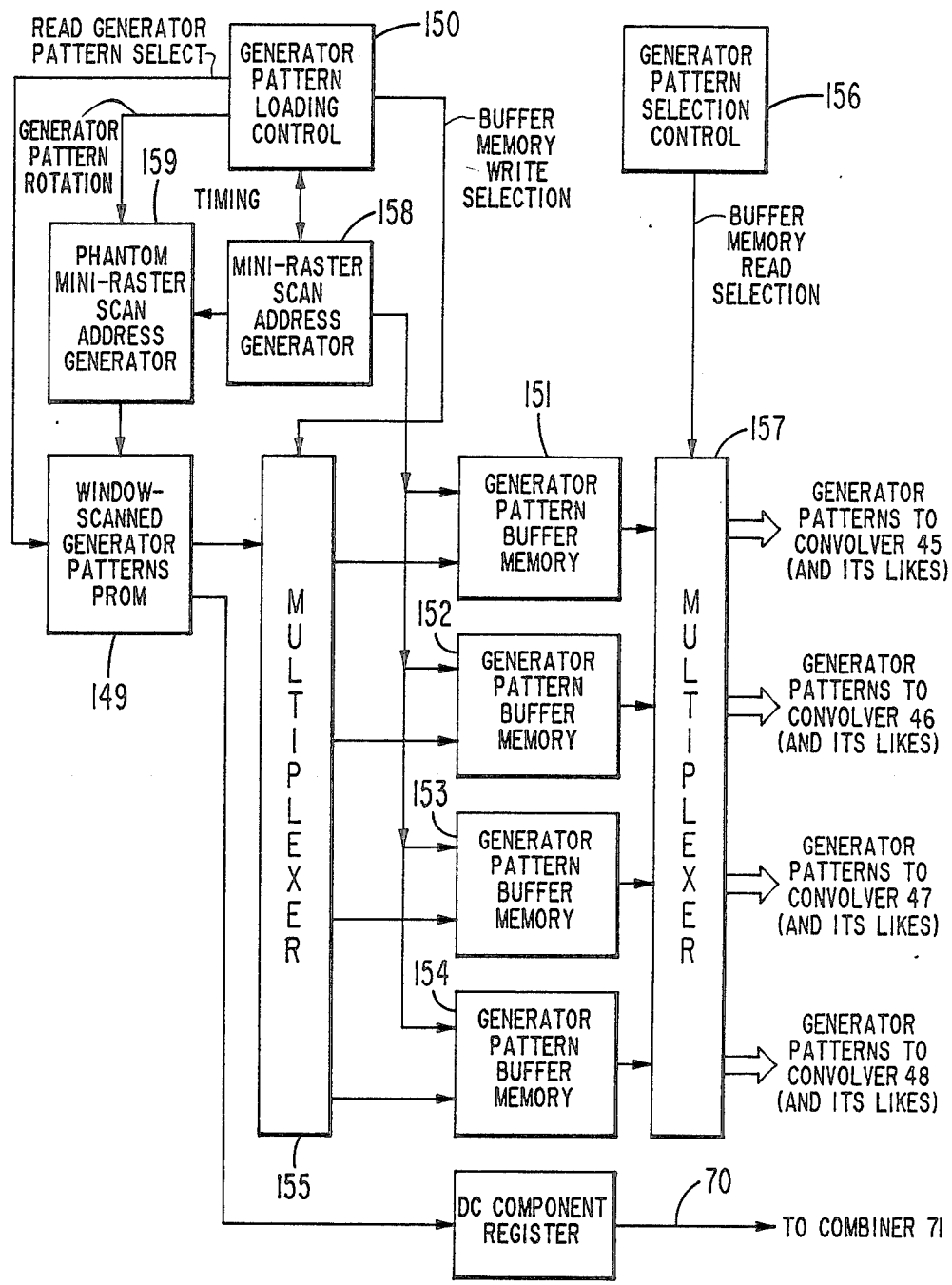
FIG. 11 is a block schematic of apparatus for rotating the generator pattern prior to being convolved with the seed patterns in modifications of the FIG. 1 fractal generator.

FIG. 11 shows apparatus for rotating the generator pattern supplied to convolvers 45–48, which apparatus replaces PROM 49 in the FIG. 1 fractal generator. Rotating the generator pattern is useful in generating certain types of display image animation, but also can be used to generate a wider variety of fractals.

A PROM 149 is used to store generator patterns in bit-map-organization. PROM 149 is of banked construction to permit its being window-scanned and has an interpolator within it to permit its contents being addressed with non-integral row and column addresses. Such memories are described by Christopher et al. in U.S. Pat. No. 4,460,958 issued 17 July 1984 and entitled "WINDOW SCANNED MEMORY".

Generator pattern loading control circuitry 150 controls the transfer of a selected generator pattern with controlled amounts of rotation from a selected region in PROM 149 to ones of a plurality of generator pattern buffer memories (e.g., the four buffer memories 151, 152, 153, 154). Storage locations in these memories are scanned serially during their writing and are available in parallel during their reading. This control is effected through BUFFER MEMORY WRITE SELECTION commands supplied to a multiplexer 155 enabling the writing of a selected one of buffer memories 151–154 with a generator pattern as read out from generator patterns PROM 149. Generator pattern selection control circuitry 155 controls which of the generator patterns stored in generator pattern buffer memories 151–154 is supplied to convolvers 45–48 and their likes in replicates of the FIG. 1 fractal generator, if more than one fractal generator is used in parallel. This control is effected by a multiplexer 157 receptive of BUFFER MEMORY READ SELECTION commands from generator pattern selection control circuitry 156. A mini-raster-scan generator 158 generates the address scanning for writing buffer memories 151–154. (A mini-raster scan is a "miniature" raster scan extending over relatively small region in the entire image field.) Mini-raster-scan generator 158 supplies its raster scanned memory addresses an input to a phantom raster generator 159 for scan conversion to generate a phantom mini-raster rotated in accordance with a GENERATOR PATTERN ROTATION command supplied from generator pattern loading control 150. The GENERATOR PATTERN ROTATION commands are operator-programmed. The generator pattern is furnished in progressive rotation during each mini-raster scan and is written into a respective one of generator pattern buffer memories 151–154, via multiplexer 155.

When display animation by generator pattern rotation is desired, generator pattern selection control circuitry 156 successively selects progressively rotated generator patterns from the buffer memories 151–154 for convolution with speed patterns in convolvers 45–48. This successive selection is in a pattern to produce clockwise rotation or counterclockwise rotation or combinations thereof on kinescope 98 display screen.

The FIG. 11 apparatus may also be employed in the generation of complex fractals using a plurality of fractal generators operated in parallel. The seed patterns used in the fractal generators differ, and generator pattern selection control circuitry 156 selects generator patterns of different rotations to the fractal generators in each sample space.

Figure 12:
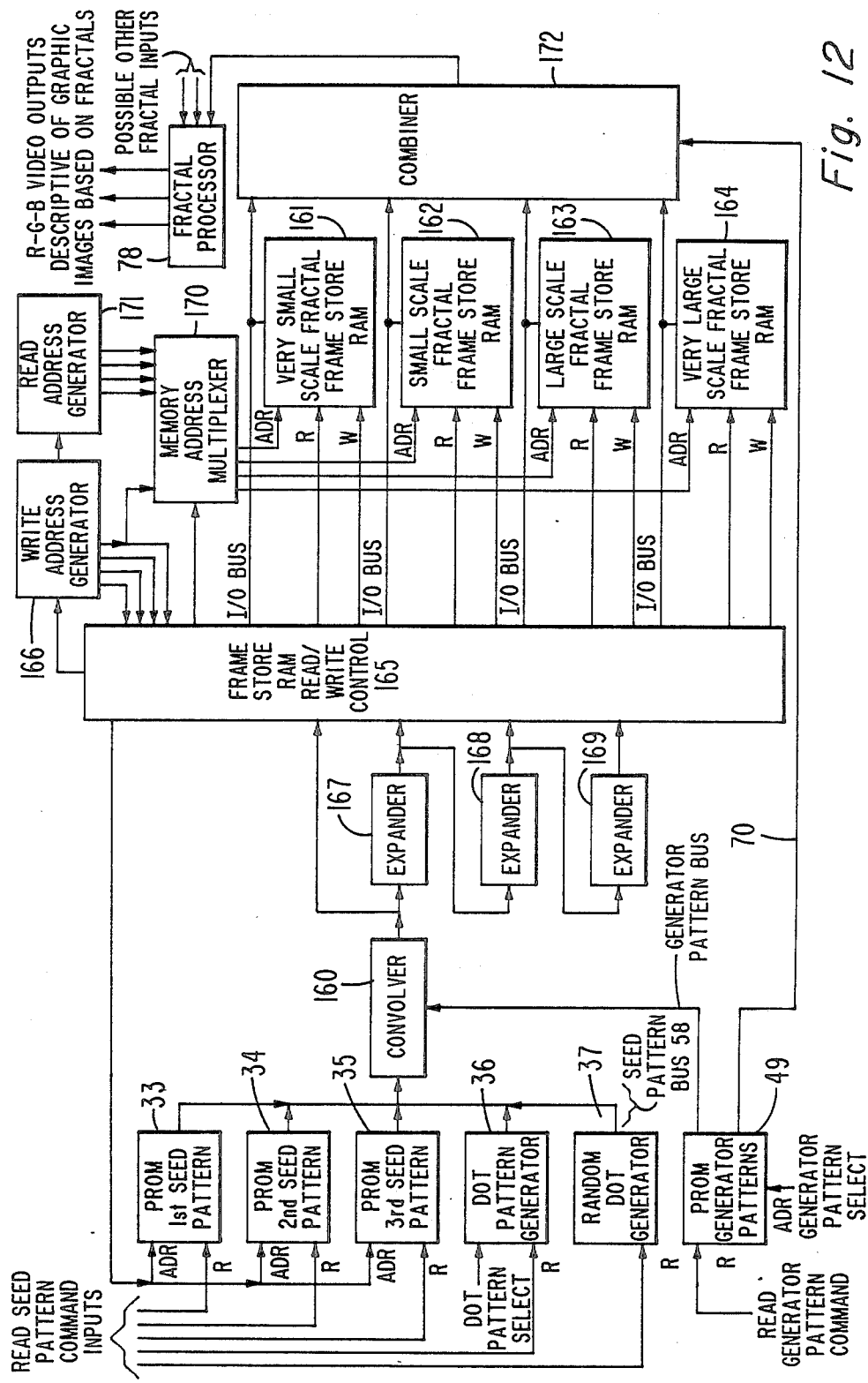
FIG. 12 is a block schematic diagram of another fractal generator embodying the invention.

FIG. 12 shows another fractal generator that has an ability to generate animated fractals in real time. A single convolver 160 is used to generate convolution results for each band-pass component of the fractal being generated, by convolving a generator pattern selected from PROM 49 with a seed pattern selectively provided from PROM 33, PROM 34, and PROM 35, dot pattern generator 36 or random dot generator 37. There is one selected seed pattern, at very fine resolution, with which the generator pattern selected from PROM 49 is convolved for generating each different spatial frequency component of the fractal.

Assume these convolutions are carried out to generate, in succession, one frame of video signal samples at very fine resolution for each of the spatial frequency bands, with the very small scale fractal variations being written into a respective frame store RAM 161, with the small scale fractal variations being written into a respective frame store RAM 162, with the large scale fractal variations being written into a respective frame store RAM 163, and with the very large scale fractal variations being written into a respective frame store RAM 164. RAMs 161, 162, 163 and 164 are configured to be continuously scrollable in both horizontal and vertical scan directions. Frame store read/write control circuitry 165 controls the writing of frame store RAMs 161, 162, 163 and 164. Control circuitry 165 commands a memory address multiplexer 170 to connect RAMs 161, 162, 163 and 164 during their writing to write address generator 166 to receive full-resolution write addresses supplied at normal pixel-scan rate. On a frame scan, read/write control circuitry 165 conditions a write address generator 166 to generate a frame scan at normal pixel-scan rate for application to seed pattern PROMs 33, 34, 35 and conditions dot generators 36 and 37 to generate dots of a specified average density in each direction of scan. The seed pattern from the selected one of seed pattern PROMs 33, 34, 35; dot pattern generator 36; or random dot generator 37 is convolved with the generator pattern selected from PROM 49. The convolution results are for very small scale fractal variations and are routed by read/write control circuitry 165 onto the input/output bus of frame store RAM 161, which control circuitry 165 conditions for being written into. On a second frame scan, read/write control circuitry 165 conditions write address generator 166 to generate addresses scanning a quarter portion of full frame at one-quarter normal pixel-scan rate and conditions dot generators 36 and 37 to generate dots of half specified average density in each direction of scan. Convolution results generated at one-quarter normal pixel-scan rate are supplied to an expander 167, which expands the sample matrix density twofold in each direction, using interpolative techniques. Control circuitry 165 directs these expanded convolution results supplied at normal pixel-scan rate to the input/output bus of RAM 162 and conditions RAM 162 to write the results into its frame store. On a third frame scan, read/write control circuitry 165 conditions write generator 166 to generate addresses scanning a one-sixteenth portion of full frame at one-sixteenth normal pixel-scan rate and conditions dot generators 36 and 37 to generate dots of one-quarter specified average density in each direction of scan. Convolution results generated at one-sixteenth normal pixel-scan rate have their sample matrix twice expanded twofold in each direction, using interpolative techniques, the successive expansions being carried out by the expander 167 and an expander 168 in cascade. Read/write control circuitry 165 directs these twice-expanded convolution results supplied at normal pixel-scan rate to the input/output bus of RAM 163 and conditions RAM 163 to write the results into its frame store. On a fourth frame scan, read/write control circuitry 165 conditions write generator 166 to generate addresses scanning a one-sixty-fourth portion of full frame at one-sixty-fourth normal pixel-scan rate and conditions dot generators 36 and 37 to generate dots of one-eighth specified average density in each direction of scan. Convolution results generated at one-sixty-fourth normal pixel-rate have their sample matrix thrice-expanded twofold in each direction by the cascade connection of the expander 167, the expander 168 and a further expander 169. Read/write control circuitry 165 directs the thrice-expanded convolution results supplied at normal pixel-scan rate to the input/output bus of RAM 164 and conditions RAM 164 to write the results into its frame store.

In an alternative procedure for writing frame store RAMs 161, 162, 163 and 164, convolution by convolver 160 may proceed on a time-division-multiplex basis. Every other one of twice-normal pixel-scan rate sample times is dedicated to writing RAM 161; alternate remaining sample times are dedicated to writing RAM 162. Alternate then remaining sample times are dedicated to writing RAM 163, and alternative still remaining sample times are dedicated to writing RAM 164.

A still different way to write RAMs 161, 162, 163 and 164 is to use rate buffer memories after convolver 160. These rate buffer memories supply convolution result samples at lowered rates for an expander generating samples to write RAM 162, for a cascade of two expanders generating samples to write RAM 163, and for a cascade of three expanders generating samples to write RAM 164.

After RAMs 161, 162, 163 and 164 are written with very-small-scale fractal variations, small-scale fractal variations, large-scale fractal variations, and very-large-scale fractal variations, respectively, a succession of frames of video descriptive of fractal-based animation may be generated by scanning these RAMs while introducing respective address offsets from frame to frame. During this phase of operation read/write control circuitry 165 commands memory address multiplexer 170 to connect RAMs 161, 162, 163 and 164 to receive read addresses from a read generator 171. The fractal components read out of RAMs 161, 162, 163 and 164 to their respective input/output buses and the generator pattern direct component supplied to bus 70 are combined in a combiner 172 to generate the fractal supplied to fractal processor 78. Combiner 171 may be an adder tree, for example.

Figure 13:
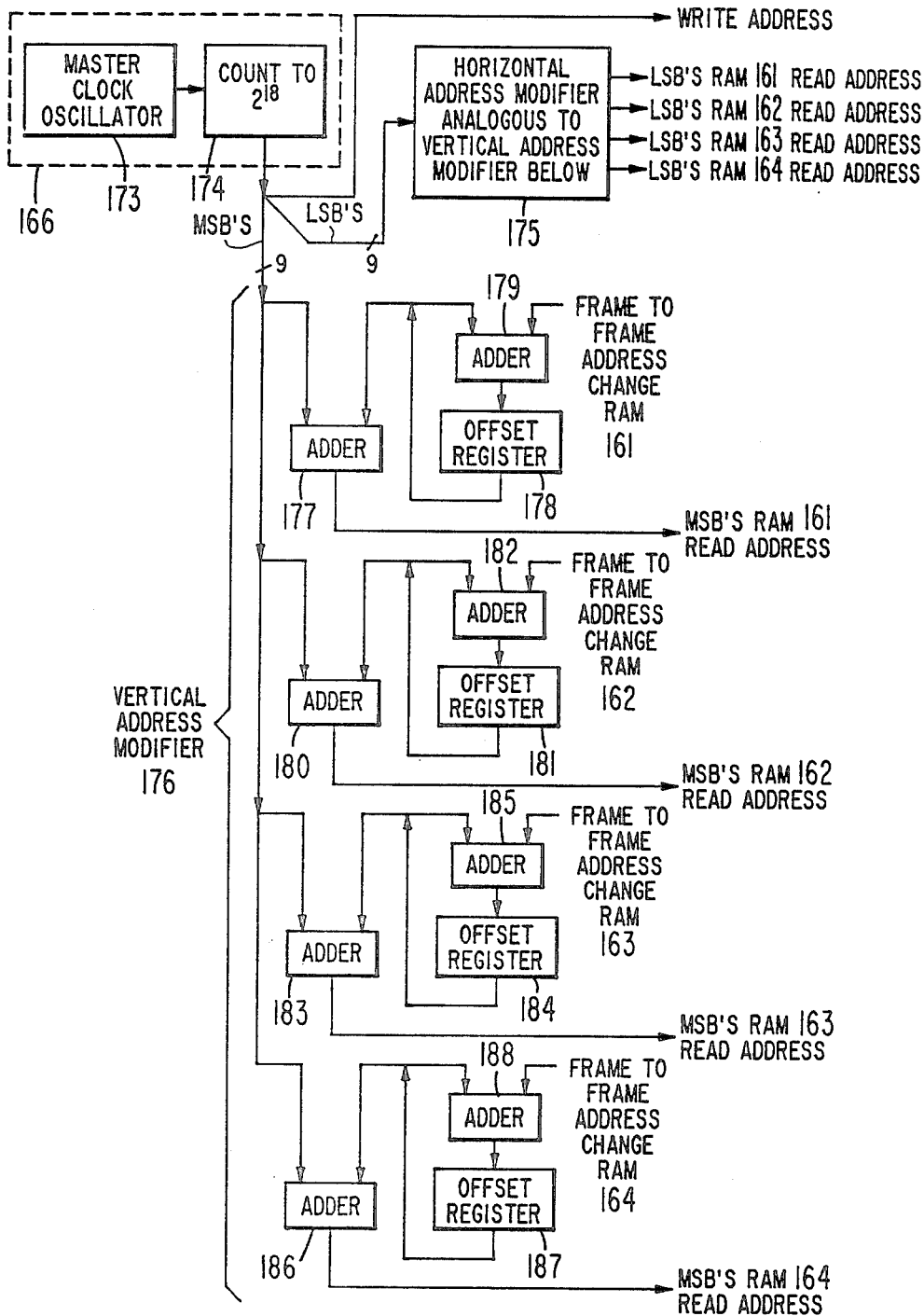
FIG. 13 is a block schematic diagram of address generating apparatus used in the FIG. 12 fractal generator.

FIG. 13 is useful in gaining a better understanding of how address generation proceeds. WRITE ADDRESS generator 166 may simply comprise a master clock oscillator 173 and a counter 174 counting clock oscillations modulo-$2^{18}$, assuming a 512-line non-interlaced frame with five hundred twelve pixels per scan line. The nine most significant bits of the WRITE ADDRESS signal generated by counter 174 as its output identify the scan line by number; and the nine least significant bits represent the pixel position along scan line. (Both of these WRITE ADDRESS components may have certain of their respective less significant bits discarded, to generate a scan of a reduced portion of full frame at less than normal pixel-scan rate, for implementing the FIG. 12 serial convolution process described above.) The nine least significant bits of WRITE ADDRESS signal are supplied (it being assumed line scan is in the horizontal direction) to a horizontal address modifier 175, which generates portions of the READ ADDRESS signals for RAMs 161, 162, 163 and 164 indicating pixel position along scan line. This is done analogously to the way a vertical address modifier 176, now to be described, generates other portions of the READ ADDRESS signals indicating scan line by number, in the reading of each of RAMs 161, 162, 163 and 164.

In vertical address modifier 176 the nine most significant bits of the WRITE ADDRESS signal have an offset added to them in an adder 177 to generate the scan line identification portion of RAM 161 READ ADDRESS signal. The offset is supplied to adder 177 from an output register 178 and is the accumulation of successive frame to frame address changes. During frame retrace an adder 179 adds the change in line scan number from the previous frame line scan number—i.e., the amount of vertical scroll component—to the previous frame offset as stored in offset register 178, and the resultant sum is entered into offset register 178 to update its contents.

Analogously, the nine most significant bits have offsets added to them in adders 180, 183 and 186 to generate the scan line identification portions of RAM 162 READ ADDRESS signal, of RAM 163 READ ADDRESS signal, and of RAM 164 READ ADDRESS signal respectively. An offset register 181 and an adder 182 are connected to accumulate the offset applied to adder 180. An offset register 184 and an adder 185 are connected to accumulate the offset applied to adder 183. An offset register 187 and an adder 188 are connected to accumulate the offset applied to adder 186. Adders 177, 179, 180, 182, 183, 185, 186 and 187 are preferably of a type accommodating the use of signed numbers, so movements in either of two opposing directions are conveniently made.

Doubling of the frame-to-frame increments supplied to adders 182, 183 and 184 as compared to those supplied to adders 181, 182 and 183 respectively will cause vertical drift of the entire fractal, as a simple example of frame-to-frame fractal animation. More complex movements of the component fractals can be arranged, too—e.g., rotations using phantom raster scan techniques.

Figure 14:
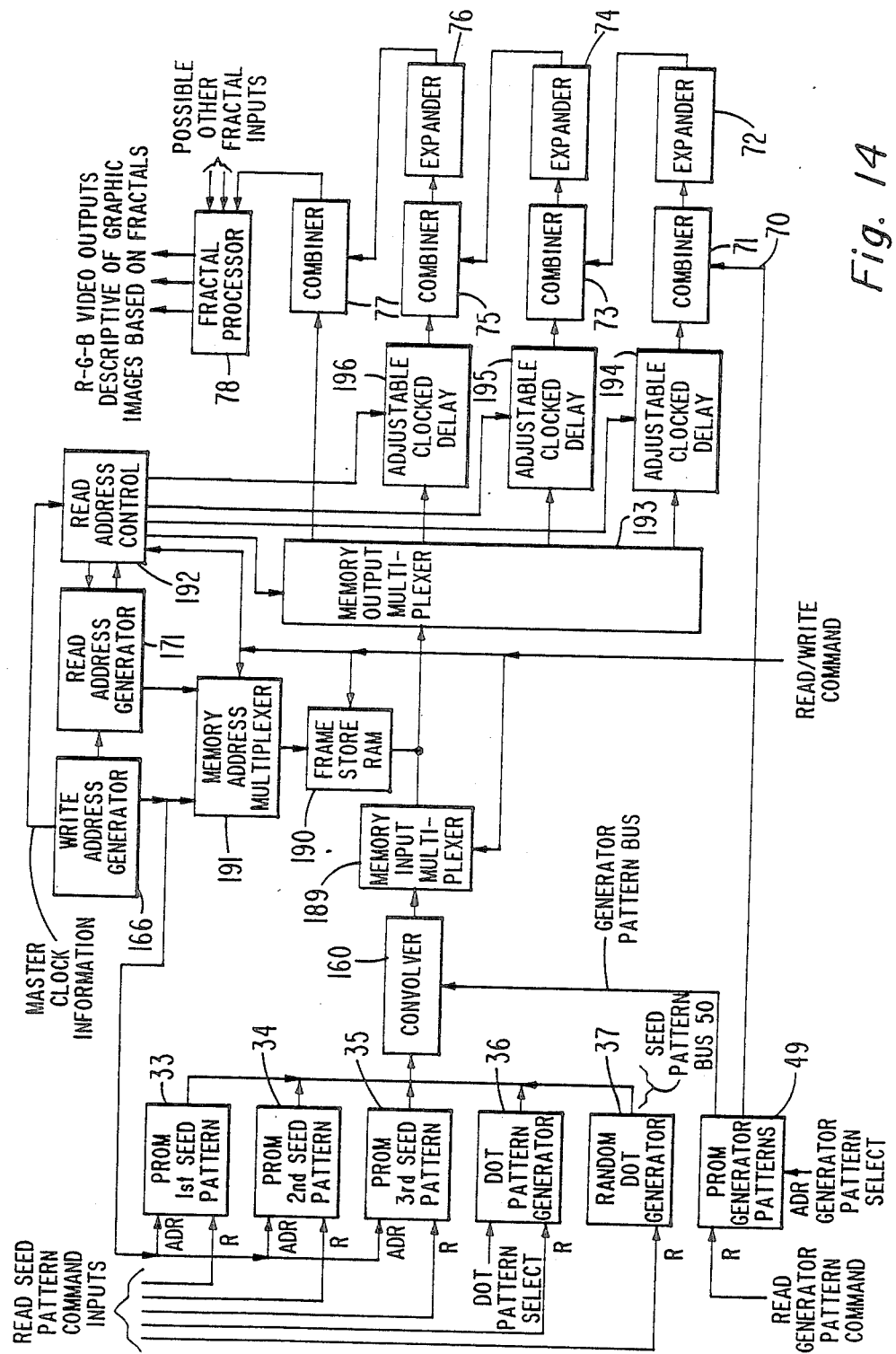
FIGS. 14 and 15 are block schematic diagrams of still other fractal generators embodying the invention.

FIG. 14 shows a fractal generator which like the FIG. 12 fractal generator uses a single convolver 160 to generate the various-scale components of the fractal. The FIG. 14 fractal generator does not re-sample all the fractal components into high-spatial-resolution sampling matrices for storage in frame store RAMs 161, 162, 163 and 164 as was done in FIG. 12, however. Instead, the convolution results at the highest spatial resolution, as provided by convolving at nominal pixel-scan rate, are stored in one frame store RAM 190.

RAM 190 subsequently supplies these stored highest-spatial-resolution convolotion results for the first sample space, analogously to RAM 161 in the FIG. 12 fractal generator. RAM 190 also supplies stored convolution results for the second sample space, which are subsequently expanded 2:1 in scale in each spatial dimension. This generates expanded convolution results at next-to highest spatial resolution over an area four times as large as that stored in frame store RAM 162 of the FIG. 12 fractal generator. RAM 190 also supplies stored convolution results for the third sample space, which are subsequently twice-expanded 2:1 in scale in each spatial dimension to provide an overall expansion of 4:1 in each spatial dimension. This generates expanded convolution results at next-to-lowest spatial resolution over an area sixteen times as large as that stored in frame store 163 of the FIG. 12 fractal generator. Finally, RAM 190 supplies stored convolution results for the fourth sample space, which are thrice-expanded 2:1 in scale in each dimension to provide an overall expansion of 8:1 in each spatial dimension. This generates expanded convolution results at lowest spatial resolution over an area sixty-four times as large as that stored in frame store 164 of the FIG. 12 fractal generator.

In the FIG. 12 fractal generator one is quite likely to notice the cycloramic effect as one scrolls the frame stores 161, 162, 163, 164 completely around. In the FIG. 14 fractal generator the cycloramic effect is much, much less noticeable. Only the highest-spatial-frequency details cyclically repeat on a one frame basis. The lower-spatial-frequency fractal components cyclically repeat less frequently. There is a pyschophysical phenomenon that one is less likely to notice cyclic repetition of form if the cycle length is long compared to the spatial wave-lengths making up the repeated pattern. In plainer words, you remember big features of the image beginning to repeat over a given distance more easily than you remember the accompanying intricacy of detail tending to repeat. It is harder to detect the cyclic repetition of higher-spatial-frequency details when they are superposed on less frequently repeating lower-spatial-frequency details. Detection of cyclic repetition becomes even more difficult when the fractal is subsequently subjected to non-linear processing in the generation of image for display. In practical terms, in the FIG. 14 fractal generator the cyclorama completes its loop only after a path of eight frame crossings is completed. This manifold increase in the area of fractal mapped in a frame store is of importance when a fractal generator is used to generate the playing field in a video game, for example.

This scaling up of the area of fractal variations stored in a bit-map-organized memory relies on the self-similarity property of fractals. This increased-area storage phenomenon can be exploited in somewhat different ways than in the FIG. 14 fractal generator. One can modify the FIG. 14 fractal generator, for example, to replace the frame store RAM 190 with a quarter-frame-store RAM from which fractals are generated that cyclically repeat twice as often in unmodified FIG. 14 fractal generator. In fact, RAM 190 can be shrunk in size until one finds the cycloramic effect to become objectionable to most viewers of video graphics generated from the specific fractal(s) one choses to generate.

(Also, one may modify the FIG. 1 fractal generator to take advantage of the increased-area storage phenomenon. Cycloramic effects can be reduced by quadrupling the size of RAMs 12 and 17, increasing the size of RAMs 13 and 18 sixteenfold, and multiplying the size of RAM's 14 and 19 sixty-four-fold, so RAM's 11–14 and 16–19 each have the same number of addressable storage locations as the others. That is, about a three times increase in RAM size in terms of adressable storage locations will reduce cycloramic effect by eight times.)

Now consider the FIG. 14 fractal generator in greater detail, beginning with storing convolution results in RAM 190. Responsive to a READ/WRITE COMMAND signal being in its write condition, an input memory multiplexer 189 supplies convolution results from convolver 160 to the input/on bus of RAM 190; RAM 190 is conditioned to write the convolution results into addressed storage locations; and a memory address multiplexer 191 applies WRITE ADDRESS signals to frame store RAM 190 to specify the storage locations into which the successive convolution results are written in a bit-map organization of storage.

When the READ/WRITE COMMAND signal is in the read condition, RAM 190 is conditioned for being read out onto its input/output bus; and memory address multiplexer 191 is conditioned to select READ ADDRESS signals from read address generator 171 to address storage locations in RAM 190. Read address control circuitry 191 is placed into operation to read out frame store 190 in the first sample space, the second sample space, the third sample space and the fourth sample space on a time-division-multiplex basis. The time-division-multiplexing is carried out at twice-normal pixel-scan rate. The sequence in which one of the repeated cycles of time-division-multiplexing is carried out during a line scan is: 1, 2, 1, 3, 1, 2, 1, 4, 1, 2, 1, 3, 1, 2, 1, N. In this sequence 1, 2, 3 and 4 represent samples in the first, second, third and fourth sample spaces, respectively; and N represents a null sample to fill out the cycle. Successive 1's in the cycle represent successive samples in the first sample space; successive 2's in the cycle, successive samples in the second sample space; and successive 3's, successive samples in the third sample space.

Alternate ones of the twice-normal pixel-scan-rate samples read from frame store RAM 190 are assigned to the first sample space, defining the fractal component with highest resolution. Read address control circuitry 192 conditions read address generator 171 to supply READ ADDRESS signal for the first sample space. Read address control circuitry 192 also conditions memory output multiplexer 193 to supply convolution results for the first sample space read-out from RAM 190 to combiner 77, there to be combined with expanded convolution results from the expander 76 to generate the fractal supplied to fractal processor 78.

Read address control circuitry 192 conditions RAM 190 to be read out every second line of frame scan, in a selected one of the two available spatial phasings in the vertical direction, for supplying convolution results assigned to the second sample space. Of the twice-normal pixel-rate samples read from RAM 190 in the selected alternate scan lines, alternate ones of those every other samples intervening between the samples assigned to first sample space are assigned in accordance with the time-division-multiplexing scheme to the second sample space, in which the fractal component with next-to-highest spatial resolution is defined. During these sample times assigned to the second sample space, read address control circuitry 192 conditions read address generator 171 to supply READ ADDRESS signal for the second sample space. (This READ ADDRESS signal includes, in its offset, delay compensation for expander 76.) Concurrently, read address control circuitry 192 conditions memory output multiplexer 193 to apply RAM 190 readout to combiner 75, to be combined with expanded terms from the third sample space which are supplied by expander 74. The application of RAM 190 read-out to combiner 75 is shown as being done through the agency of an adjustable clocked delay 196, rather than being done directly. Adjustable clocked delay 196 under control of read address control circuitry 192 adjusts the spatial phasing of the second space samples to a selected one of the two possible phasings in the horizontal direction, as referred to the first sample space. This allows horizontal scrolling with first-sample-space resolution, to get around the arbitrary assignment of spatial phasing attendant with the time-division-multiplexing scheme, so spatial phasing of the second sample space can be chosen as freely as in the FIG. 12 fractal generator.

Read address control circuitry 192 conditions RAM 190 to be read out every fourth line of frame scan in a selected one of the four available spatial phasings in vertical direction, for supplying convolution results assigned to the third sample space. Alternate ones of the remaining not yet selected ones of the twice-normal pixel-scan rate samples in the time-division-multiplexing cycle, as occur in the selected every fourth line scans, are assigned in accordance with the time-division-multiplexing scheme to the third sample space, in which the fractal component with next-to-lowest spatial resolution is defined. During those sample times assigned to the third sample space, read address control circuitry 192 conditions read address generator 171 to supply READ ADDRESS signal for the third sample space. (This READ ADDRESS signal includes, in its offset, delay compensation for expander 74.) Concurrently, read address control circuitry 192 conditions memory output multiplexer 193 to apply RAM 190 readout to combiner 73 to be combined with expanded terms from the fourth sample space supplied by expander 72. The application of RAM 190 read-out to combiner 73 is shown as being done through the agency of adjustable clocked delay 195, rather than being done directly. Adjustable clocked delay 195 under control of read address control circuitry 192 adjusts the spatial phasing of the third space samples to a selected one of the four possible phasings in the horizontal direction, as referred to the first sample space. This allows horizontal scrolling of fully expanded third sample space with first-sample-space resolution.

Read address control circuitry 192 conditions RAM 190 to be read out every eighth line of frame scan in a selected one of the eight available spatial phasings in vertical direction, for supplying convolution results assigned to the fourth sample space. Alternate ones of the remaining not yet selected ones of the twice-normal pixel-scan rate samples in the time-division-multiplexing cycle, as occur in the selected every eighth line scans, are assigned in accordance with the time-division-multiplexing scheme to the fourth sample space, in which the fractal component with lowest spatial resolution is defined. During those sample times assigned to the fourth sample space, read address control circuitry 192 conditions read address generator 171 to supply READ ADDRESS signal for the fourth sample space. (This READ ADDRESS signal includes, in its offset, delay compensation for expander 72.) Concurrently, read address control circuitry 192 conditions memory output multiplexer 193 to apply RAM 190 readout to combiner 71, to be combined with direct component, if any, supplied from generator pattern PROM 49 via connection 70. The application of RAM 190 readout to combiner 71 is shown as being done through the agency of an adjustable clocked delay 194, rather than being done directly. Adjustable clocked delay 194 under control of read address control circuitry 192 adjusts the spatial phasing of the fourth space samples to a selected one of the eight possible phasings in the horizontal direction, as referred to the first sample space. This allows horizontal scrolling of fully expanded fourth sample space with first-sample-space resolution.

The adjustable clocked delays 194, 195 and 196 may, for example, be provided by devices denominated "multilevel pipeline registers" by their manufacturer Advanced Micro Devices, Inc. The number of clock cycles of delay through these devices has a fixed component to compensate for the time skew introduced by time-division-multiplexing in the direction of line scan. Additionally the devices 194, 195 and 196 have components corresponding to additional bits of spatial resolution in the horizontal components of the READ ADDRESS SIGNALS in the second, third and fourth sample spaces, respectively. There is an additional bit of horizontal resolution in the second sample space; two additional bits, in the third sample space; and four additional bits, in the fourth sample space. This is necessary to make up for the restrictions the time-division-multiplexed readout from RAM 190 imposes on the horizontal phase of sampling from RAM 190 in the second, third and fourth sample spaces.

One must also make appropriate steps to provide for vertical scrolling of the second, third, and fourth sample spaces with first sample space resolution. This is rather simply taken care of by adjusting the differential delay of the onsets of READ ADDRESS signal raster scans in the various sample spaces. The timing of clocking and shift signals to the expanders 72, 74 and 76 must continue to track READ ADDRESS raster scan in their respective sample spaces, despite adjustment to the relative spatial phases of the raster scans in the four sample spaces.

The FIG. 14 fractal generator may be modified to replace RAM 190 with two RAMS storing convolver 160 convolution results in parallel, so RAM readout can be at normal pixel-scan sample rate. One RAM supplies convolution results for the first sample space; and the other RAM supplies convolution results for the second, third, etc. sample spaces.

Variants of the FIG. 12 and FIG. 14 fractal generator, are readily constructed, wherein one RAM or set of RAMs is being read from to generate a sequence of fractal animation, while another RAM or set of RAMs is being written with convolution results to be used in generating a following sequence of fractal animation. Variants of the FIG. 12 and FIG. 14 fractal generators which allow for the use of field-to-field line interlace are, of course, possible.

Figure 15:
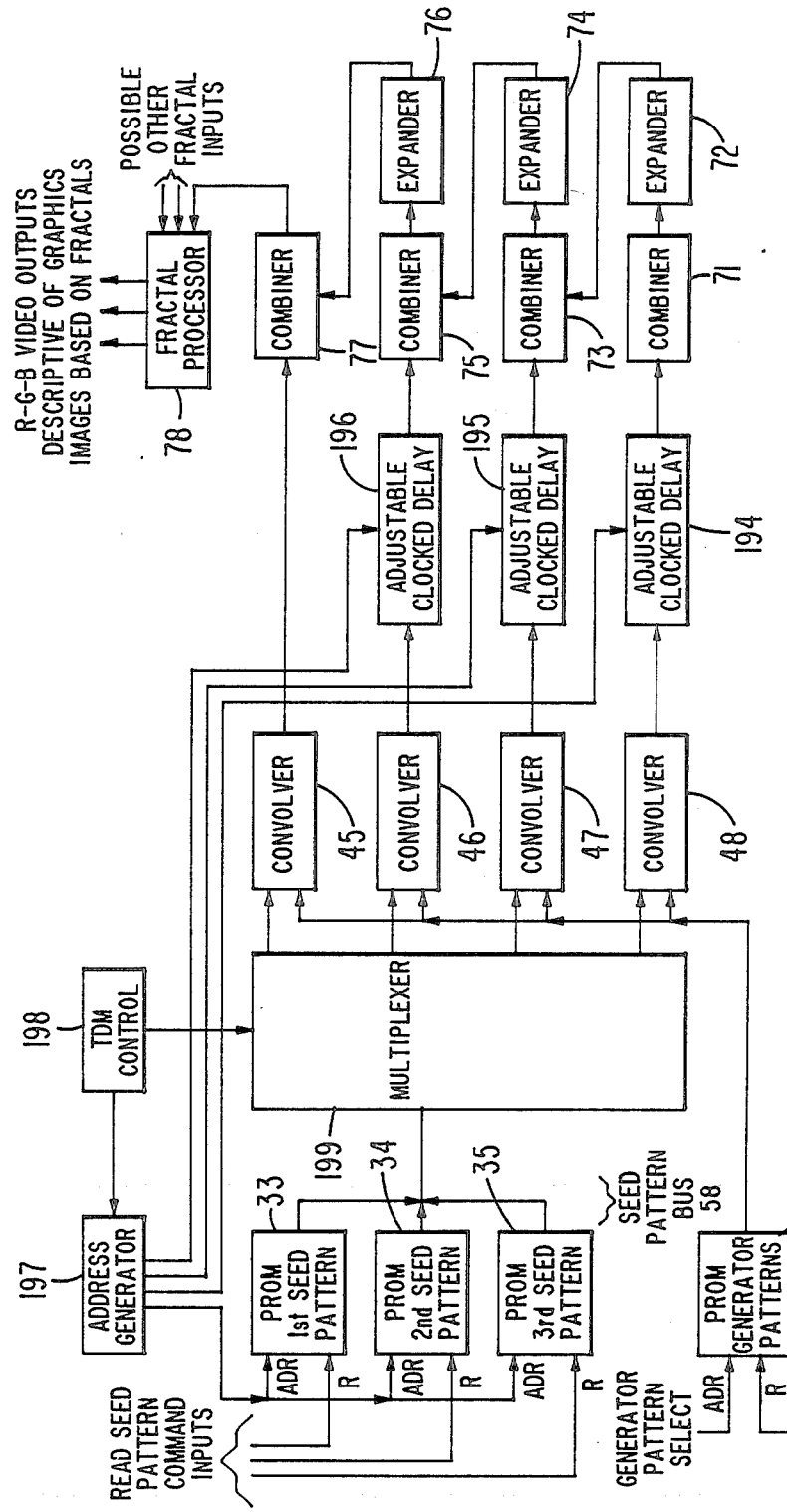

FIG. 15 shows a fractal generator which avoids the storage of convolution results in memory and instead relies on the storage of the seed pattern itself as a basis for relating the position of the various fractal components in their respective sample spaces. An address generator 197 furnishes raster-scanning READ ADDRESS signals to a selected one of seed pattern PROMs 33, 34, 35. This is done on a time-division-multiplex basis, much as was done in the FIG. 14 fractal generator, responsive to control signals from the time-division-multiplex control circuitry 198. Multiplex control circuitry 198 also controls a multiplexer 199 that applies the read-out of the selected of the seed pattern PROMs 33, 34, 35 to the one of convolvers 45, 46, 47, 48 operative in the sample space to which the current sample of raster-scanned read-out relates. Before cycloramic effects occur in the lower spatial frequencies, the fractals generated by the FIG. 15 fractal generator extend over an area sixty-four times as large as that sampled on a pixel-by-pixel basis by the selected one of the seed pattern PROM's 33, 34, 35.

The seed pattern information is less diffuse in space than convolution results, which involve integration in their generation. So, a memory storing seed pattern of dots resonably sparsely distributed through space is likely to be more susceptible to compaction that a memory storing convolution results. For example, the seed pattern may be stored in a line-addressed memory in which run-length-codes indicate dot portions along scan lines. In another example, one may address the selected seed pattern PROM 33, 34, 35 in somewhat coarser resolution raster scan, storing the less significant of the dot addresses as data in memory. The PROM can then be read out at full resolution using the pixel phasing techniques described by Sasaki and Davis in U.S. Pat. No. 4,481,509 issued Nov. 6, 1984, entitled "RASTER-SCANNED DISPLAY SYSTEM FOR DIGITALLY-ENCODED GRAPHICS," and assigned to RCA Corporation. Where dot patterns are repetitive in nature, a smaller memory size may be selected and its storage locations re-read severalfold. With certain seed patterns, one can use a seed pattern memory, the storage locations of which are addressed by non-consecutive integral spatial coordinates in accordance with the teaching of G. A. Reitmeier and C. H. Strolle in U.S. Pat. No. 4,442,545, issued Apr. 10, 1984, entitled "COMPACTION OF TELEVISION DISPLAY GRAPHICS IN PHANTOM-RASTER-SCANNED IMAGE MEMORY," and assigned to RCA Corporation.

In the design of the convolvers for implementing the generation of animated fractals in accordance with the invention, one must keep in mind that the cycloramic loop-around of the image data extracted from memory depends on space being considered cyclic, as in modular, items. The results of a convolution of the generator pattern with a seed pattern dot that is close to one edge of the range of memory address in a spatial dimension (which memory addresses repose in non-modular, bounded memory address space) must appear not only near that edge of the range, but near the opposing edge. Otherwise, there will be discontinuities in the convolution results that will be obtrusively present in the scanned fractal. Convolution in modular spatial terms is easily arranged for by some "overlapping" scan of memory, but has to be taken into account if the seed pattern has dots near the edge of memory address space or the equivalent of that space for dot generators 36 and 37.

The fractal generation procedures described in this specification are also applicable to generating related functions that are not strictly fractals, in which the generator patterns involved in the convolutions at the different scalings are not all self-similar variants of exactly the same shape. In the claims which follow "fractal" should be defined loosely enough to include such related functions.

What is claimed is:

1. A method of generating fractals comprising the steps of:
   convolving generator patterns with seed patterns of dots to generate convolution results for each of a plurality of sample spaces, such spaces being consecutively ordinally numbered in order of their successively more sparse sampling;
   expanding the convolution results in each of the higher numbered sample spaces through interpolation to a sampling density comparable to that in a lower numbered sample space;
   combining samples of the convolution results and the expanded convolution results of similar sampling density on a corresponding sample-by-sample basis; and
   carrying out said steps of expanding through interpolation and said steps of combining so as to result in the expanded convolution results of each of the higher numbered sample spaces ultimately being combined with the convolution results in said first sample space, thereby generating said fractals.

2. A method of generating a fractal comprising the steps of:
   providing a seed pattern of dots in each of a a plurality of sample spaces consecutively ordinally numbered first through $n^{th}$, said first sample space being regularly sampled in a plurality of dimensions, and each other sample space being regularly sampled in those dimensions more sparsely than the sample space with the next lower ordinal number;
   providing a generator pattern in a normalized sample space;
   performing a spatial convolution of said generator pattern with the respective seed patterns in each of the sample spaces;
   expanding, by means of interpolating, the spatial convolution result obtained in each said other sample space to the sampling density of said first sample space and combining the expanded spatial convolution result with the spatial convolution result obtained in said first sample space, to result in said fractal.

3. A method for generating a fractal as set forth in claim 2 wherein said expanding and combining step comprises the steps of;

expanding by means of interpolation the spatial convolution result obtained in the $n^{th}$ sample space to the sampling density of the $(n-1)^{th}$ sample space;

combining the expanded spatial convolution result obtained in the $n^{th}$ sample space with the spatial convolution result obtained in the $(n-1)^{th}$ sample space;

thereafter successively combining in each of the $(n-2)^{th}$ through first sample spaces the spatial convolution result obtained in that sample space and an expanding result previously obtained in the next-higher-numbered sample space; and expanding, by means of interpolation, the result of combining in each sample space other than the first, to the sampling density of the next-lower-numbered sample space, said fractal resulting from combining in said first sample space.

4. A method of generating a fractal as set forth in claim 3 wherein said combining is additive.

5. A method of generating a fractal as set forth in claim 2 wherein said combining is additive.

6. A method of generating fractals as set forth in claim 2 further comprising the steps of:

repeating said steps of choosing a seed pattern of dots in each of said plurality of sample spaces, of choosing a generator pattern in a normalized sample space, of performing a spatial convolution in each of the sample spaces, of expanding and of combining, wherein the choice of seed patterns is changed in the course of repetition, to result in a series of fractals including at least one further fractal in addition to said fractal.

7. A method of generating fractals as set forth in claim 2 further comprising the steps of:

repeating said steps of choosing a seed pattern of dots in each of said plurality of sample spaces, of choosing a generator pattern in a normalized sample space, of performing a spatial convolution in each of the sample spaces, of expanding and of combining, wherein the positioning of the seed patterns relative to reference points in space is changed in the course of repetition, to result in a series of fractals including at least one further fractal in addition to said fractal.

8. A method of generating fractals as set forth in claim 2 further comprising the steps of:

repeating said steps of choosing a seed pattern of dots in each of said plurality of sample spaces, of choosing a generator pattern in a normalized sample space, of performing a spatial convolution in each of the sample spaces, of expanding and of combining, wherein the generator pattern is rotated in at least one of the sample spaces during the course of repetition, to result in a series of fractals including at least one further fractal in addition to said fractal.

9. A method of generating fractals as set forth in claim 8 further comprising the steps of:

repeating said steps of choosing a seed pattern of dots in each of said plurality of sample spaces, of choosing a generator pattern in a normalized sample space, of performing a spatial convolution in each of the sample spaces, of expanding and of combining, wherein the seed pattern is rotated in at least one of the sample spaces during the course of repetition, to result in a series of fractals including at least one further fractal in addition to said fractal.

10. A method of generating fractals as set forth in claim 2 further comprising the steps of:

repeating said steps of choosing a seed pattern of dots in each of said plurality of sample spaces, of choosing a generator pattern in a normalized sample space, of performing a spatial convolution in each of the sample spaces, of expanding and of combining, wherein the seed pattern is rotated in at least one of the sample spaces during the course of repetition, to result in a series of fractals including at least one further fractal in addition to said fractal.

11. A method of generating in sampled form a first raster-scanned video signal comprising the steps of:

providing for each field scan a seed pattern of dots in each of a plurality of sample spaces consecutively ordinally numbered first through $n^{th}$, said first sample space being regularly sampled in a plurality of dimensions, and each other sample space being regularly sampled in those dimensions more sparsely than the sample space with the next lower ordinal number;

providing for each field scan a respective generator pattern for each of said plurality of sample spaces consecutively ordinally numbered first through $n^{th}$;

performing a spatial convolution of each generator pattern with the seed pattern sampled at the same sampling density in accordance with a raster scanning pattern, to obtain for each field scan a convolution result at that respective sampling density;

expanding by means of interpolation those convolution results of lower sampling density and combining the convolution results at similar sampling densities;

obtaining in response to said expanding and combining steps the combination of those convolution results in a raster-scanned sample space; and converting each level sample of said combination of convolution results to a respective level sample of said first raster-scanned video signal in accordance with an established scheme.

12. The method of claim 11 wherein said step of converting each level sample of said combination of convolution results converts each level to respective level samples of each of first, second and third raster-scanned video signals.

13. The method of claim 12 wherein said first, second and third video signals are red video signal, green video signal, and blue video signal, respectively.

14. A method for generating a composite video signal using the first video signal generated by the method steps of the claim 11 in combination with the steps of:

generating at least one further video signal raster-scanned in synchronism with said first raster-scanned signal; and selecting from said first video signal and said at least one further video signal on a time-division-multiplex basis, to generate said composite signal.

15. The method of claim 14 wherein said selecting from said first video signal and said at least one further video signal on a time-division-multiplex basis is controlled at least in part using a map stored in a synchronously scanned memory.

16. The method of claim 14 wherein said selecting from said first video signal on a time-division-multiplex basis is carried out by the steps of:

assigning an order of priority to the portions of each said further video signal and to the portions of said first raster-scanned video signal in certain ranges; and generating said composite video signal by selecting for each successive sample thereof the one of the samples of said first video signal and each further video signal having the highest assigned priority.

17. A fractal generator comprising:
means for generating raster scanned seed patterns of dots in each of a multiplicity of two-dimensional sample spaces consecutively ordinally numbered first through $n^{th}$ and successively more sparsely sampled;
means for defining a generator pattern disposed over an array of grouped pixel locations;
means for extracting, from said raster scanned seed patterns in each of said sample spaces, successive arrays of grouped pixel locations similar to that over which said generator pattern is disposed;
means for convolving in each sample space said generator pattern array and each successive array of grouped pixel locations from the raster scanned seed pattern in that sample space to obtain a respective convolution result;
respective means, associated with each sample space except the first for expanding through interpolation a function sampled in that space to the sampling density of the next lower numbered sampling space;
means for deriving from the convolution result in said $n^{th}$ sample space the function which is subsequently expanded through interpolation by said means for expanding a function sampled in said $n^{th}$ space; and
respective means for combining in each of said first through $(n-1)^{th}$ sample spaces the convolution result in that sample space with the function expanded through interpolation to the sampling density of that sample space, thereby to generate in each of said second through $(n-1)^{th}$ sample spaces the function sampled in that space which is subsequently expanded through interpolation by said means for expanding a function in that space, and to generate in said first sample space said fractal, which exhibits variation in amplitude.

18. Video signal generating apparatus comprising at least one fractal generator as set forth in claim 17 in combination with:
means responsive, at least at selected times, to different amplitudes of the fractal generated by each said at least one fractal generator for generating different color video signals.

19. Video signal generating apparatus comprising at least one fractal generator as set forth in claim 17 in combination with:
means responsive, at least at selected times, to different amplitudes of the fractal generated by each said at least one fractal generator, for generating different intensity video signals.

20. A method of generating a fractal comprising the steps of:
providing a seed pattern of dots in a normalized sample space, which is regularly sampled along spatial coordinates in a plurality of dimensions;
providing a generator pattern in said normalized sample space;
convolving said generator pattern with said seed pattern to generate convolution results;
writing said convolution results into a first memory having storage locations identifiable to respective sets of integral values of said spatial coordinates;
expanding at least portions of said convolution results through interpolation in each of said plurality of dimensions, a number of times;
writing the once-expanded convolution results into a second memory having storage locations identifiable to respective sets of integral values of said spatial coordinates;
writing the plurally-expanded convolution results into respective further memories, each having storage locations identifiable to respective sets of integral values of said spatial coordinates;
reading out in parallel scanning successive storage locations in said first, second and further memories, and
combining the parallel-scanning read-outs for generating successive samples of the a fractal.

21. A method of generating fractals as set forth in claim 20 including in addition to the steps therein set forth the steps of:
repeating the steps set forth in claim 20 in each of successive fields of said parallel scanning scanning of successive storage locations in said first, second and further memories; and
changing, between fields of said parallel scanning of successive storage locations in said first, second and further memories, the offsets of the respective parallel scannings as referred to the parallel scanning of the memories during their writing, thereby to animate the generated fractals.

22. A method of generating a fractal as set forth in claim 21 wherein said combining is additive.

23. A method of generating a fractal as set forth in claim 20 wherein said combining is additive.

24. A method of generating first video signal comprising said method of generating a fractal as set forth in claim 20 in combination with the further steps of:
converting each successive level sample of the generated fractals to a sample of video signal in accordance with an established scheme; and
converting each sequence of raster-scanned video signal samples thus generated to a respective portion of said first video signal.

25. A method for generating a composite video signal using the first video signal generated by the method steps of the claim 24 in combination with the steps of:
generating at least one further video signal raster-scanned in synchronism with said first raster-scanned signal; and
selecting from said first video signal and said at least one further video signal on a time-division-multiplex basis, to generate said composite signal.

26. The method of claim 25 wherein said selecting from said first video signal and said at least one further video signal on a time-division-multiplex basis is controlled at least in part using a map stored in a synchronously scanned memory.

27. The method of claim 25 wherein said selecting from said first video signal on a time-division-multiplex basis is carried out by the steps of:
assigning an order of priority to the portions of each said further video signal and to the portions of said first raster-scanned video signal in certain ranges; and
generating said composite video signal by selecting for each successive sample thereof the one of the samples of said first video signal and each further video signal having the highest assigned priority.

28. A fractal generator for generating a raster-scanned fractal in sampled-data form that exhibits variation in amplitude, comprising:

a plurality of bit-map-organized memories, consecutively ordinally numbered first through $n^{th}$ with respective addressable arrays of storage locations for storing respective fractal components of successively larger scale;

respective means for raster scanning each of said bit-map-organized memories in synchronism with the others during a read cycle;

means for combining each set of fractal component samples read out in parallel from said plurality of bit-map-organized memories, for each of the successive addresses in their synchronous raster scans, thereby to generate one of the successive samples of said raster scanned fractal in sampled-data form; and means for selectively adjusting the offsets of the respective raster scans of said bit-map-organized memories between each of successive raster scans in their read cycle, relative to order in which the respective fractal components were stored in the addressable arrays of storage locations in said bit-map-organized memories, thereby to animate the generated fractal.

29. A fractal generator as set forth in claim 28, where n is an integer at least three, said fractal generator including:

means for scanning through the storage locations of each of said bit-map-organized memories in parallel during a write cycle;

means for generating dots at selected intervals in the write cycle;

means for convolving each of said dots with a generator pattern to generate convolution results in sampled data form as a fractal component of smallest scale;

means for writing said fractal component of smallest scale into said first bit-map-organized memory;

means expanding said convolution results through interpolation in each spatial dimension, for generating convolution results in expanded sampled-data form as a fractal component of next-to-smallest scale;

means for writing said fractal component of next-to-smallest scale into said second bit-map-organized memory;

means further expanding said convolution results through interpolation in each spatial dimension for generating (n−2) additional fractal components of successively larger scale; and means for writing each said additional fractal component into a respective one of said bit-map-organized memories other than the first and second of them.

30. Video signal generating apparatus comprising at least one fractal generator as set forth in claim 28 in combination with:

means responsive, at least at selected times, to different amplitudes of the fractal generated by each said at least one fractal generator, for generating different color video signals.

31. Video signal generating apparatus comprising at least one fractal generator as set forth in claim 28 in combination with:

means responsive, at least at selected times, to different amplitudes of the fractal generated by each said at least one fractal generator, for generating different intensity video signals.

32. A method of generating a fractal comprising the steps of:

providing a seed pattern of dots in a first sample space, which is regularly sampled in a plurality of dimensions;

providing a generator pattern;

convolving said seed pattern of dots in said first sample space with the generator pattern in said first sample space, thereby to generate spatial convolution results in said first sample space;

storing said spatial convolution results in a memory with storage locations mapping said first sample space;

selecting portions of said mapped first sample space for retrieval of spatial convolution results to be attributed to other sample spaces ordinally numbered second through $n^{th}$, n being an integer at least three, each of which other sample spaces is regularly sampled in each of said plurality of dimensions less densely than sample spaces with lower ordinal numbering than its own;

expanding, by means of interpolating, the spatial convolution result obtained in each other sample space to the sampling density of said first sample space and combining the expanded spatial convolution result with the spatial convolution result obtained in said first sample space, to result in said fractal.

33. A method of generating a fractal as set forth in claim 32 wherein said expanding and combining step comprises the steps of:

expanding by means of interpolation the spatial convolution result obtained in the $n^{th}$ sample space to the sampling density of the $(n-1)^{th}$ sample space;

combining the expanded spatial convolution result obtained in the $n^{th}$ sample space with the spatial convolution result obtained in the $(n-1)^{th}$ sample space;

thereafter successively combining in each of the $(n-2)^{th}$ through first sample spaces the spatial convolution result obtained in that sample space and an expanding result previously obtained in the next-higher-numbered sample space; and expanding, by means of interpolation, the result of combining in each sample space other than the first, to the sampling density of the next-lower-numbered sample space, said fractal resulting from combining in said first sample space.

34. A method of generating a fractal as set forth in claim 33 wherein said combining is additive.

35. A method of generating a fractal as set forth in claim 32 wherein said combining is additive.

36. A method of generating in sampled form a first raster-scanned video signal comprising the steps of:

providing, prior to an initial field scan in a sequence of field scans in said video signal, a seed pattern of dots, which dots fall on selected ones of sample locations located periodically in each of the dimensions of one of a plurality of sample spaces, which sample spaces are consecutively ordinally numbered first through $n^{th}$ and are successively more sparsely sampled;

providing, prior to an initial field scan in each said sequence of field scans, a generator pattern;

performing a spatial convolution of said seed pattern with a generator pattern to obtain sample-data convolution results in a normalized sample space;

during each subsequent field scan, re-sampling by raster scan in each of said sample spaces selected portions of the sampled-data convolution results in the normalized sample space, for generating respective convolution results in each of the ordinally numbered sample spaces;

during each subsequent field scan, expanding by means of interpolation the selected portions of the convolution results for higher numbered sample spaces to the sampling densities of lower numbered sampled spaces and combining selected convolution results at similar sampling densities;

obtaining in response to said expanding and combining steps the combination of those convolution results in a raster-scanned sample space; and converting each level sample of said combination of convolution results to a respective level sample of said first raster-scanned video signal in accordance with an established scheme.

37. The method of claim 36 wherein said step of converting each level sample of said combination of convolution results converts each level to respective level samples of each of first, second and third raster-scanned video signals.

38. The method of claim 37 wherein said first, second and third video signals are red video signal, green video signal, and blue video signal, respectively.

39. A method for generating a composite video signal using the first video signal generated by the method steps of claim 36 in combination with the steps of:

generating at least one further video signal raster scanned in synchronism with said first raster-scanned signal; and selecting from said first video signal and said at least one further video signal on a time-division-multiplex basis, to generate said composite signal.

40. The method of claim 39 wherein said selecting from said first video signal and said at least one further video signal on a time-division-multiplex basis is controlled at least in part using a map stored in a synchronously scanned memory.

41. The method of claim 39 wherein said selecting from said first video signal and said at least one further video signal on a time-division-multiplex basis is carried out by the steps of:

assigning an order of priority to the portions of each said further video signal and to the portions of said first raster-scanned video signal in certain ranges; and generating said composite video signal by selecting for each successive sample thereof the one of the samples of said first video signal and each further video signal having the highest assigned priority.

42. A fractal generator comprising:

means for generating a raster scanned seed pattern of dots in the first of a multiplicity of two-dimensional sample spaces consecutively ordinally numbered first through $n^{th}$ and sucessively more sparsely sampled;

means for defining a generator pattern disposed over an array of grouped pixel locations;

means for extracting, from said raster scanned seed pattern, successive arrays of grouped pixel locations similar to that over which said generator pattern is disposed;

means for convolving in said first sample space said generator pattern array and each successive array of grouped pixel locations from the raster scanned seed pattern in said first sample space to obtain a convolution result for each sample point in said first sample space;

means, responding to at least portions of the convolution result for said first sample space, for re-scaling them by resampling to be at the sampling densities of said sample spaces other than the first, to obtain respective convolution results for said other sample spaces;

respective means, associated with each sample space except the first for expanding through interpolation a function sampled in that space to the sampling density of the next lower numbered sampling space;

means for deriving from the convolution result in said $n^{th}$ sample space the function which is subsequently expanded through interpolation by said means for expanding a function sampled in said $n^{th}$ space; and respective means for combining in each of said first through $(n-1)^{th}$ sample spaces the convolution result in that sample space with the function expanded through interpolation to the sampling density of that sample space, thereby to generate in each of said second through $(n-1)^{th}$ sample spaces the function sampled in that space which is subsequently expanded through interpolation by said means for expanding a function in that space, and to generate in said first sample space said fractal.

43. Video signal generating apparatus comprising at least one fractal generator as set forth in claim 42 in combination with:

means responsive, at least at selected times, to different amplitudes of the fractal generated by each said at least one fractal generator, for generating different color video signals.

44. Video signal generating apparatus comprising at least one fractal generator as set forth in claim 42 in combination with:

means responsive, at least at selected times, to different amplitudes of the fractal generated by each said at least one fractal generator, for generating different intensity video signals.

45. A fractal generator comprising:

a bit-map-organized memory for storing the first and smallest-in-relative-scale of a plurality, at least three in number, of consecutively ordinally numbered fractal components, respectively of successively larger scale;

means multiply raster scanning said bit-map-organized memory on a time-division-multiplex basis during a read-out cycle for supplying a plurality, n in number, of raster-scanned read-out signals;

means for adjusting the relative time delays of the first through $n^{th}$ of said memory read-out signals respective to each other;

means for expanding, through interpolation, each of the second through $n^{th}$ of the delay-adjusted memory read-out signals, and combining them with the first fractal component for generating samples of raster-scanned fractal, which exhibit variation in amplitude.

46. A fractal generator as set forth in claim 45 including, for the purpose of fractal animation:

means for adjusting from field scan to field scan the relative offsets between the multiple raster scanning of said bit-map-organized memory; and within said means for adjusting the relative time delays of said memory read-out signals, means for re-adjusting those time delays from field scan to field scan.

47. A fractal generator as set forth in claim 46 including:

means for scanning through the storage locations of said bit-map-organized memory during a write cycle;

means for generating dots at selected intervals in that scanning;

means for convolving each of said dots with a generator pattern to generate convolution results in sampled-data form; and means for writing said convolution results in sampled-data form into said bit-map-organized memory.

48. Video signal generating apparatus comprising at least one fractal generator as set forth in claim 46 in combination with:

means responsive, at least at selected times, to different amplitudes of the fractal generated by each at least one said fractal generator, for generating different color video signals.

49. Video signal generating appratus comprising at least one fractal generator as set forth in claim 46 in combination with:

means responsive, at least at selected times, to different amplitudes of the fractal generated by each of said at least one fractal generator, for generating different intensity video signals.

50. A fractal generator comprising:

a memory storage dot intensity information in selected ones of its storage locations corresponding to points in a plural-dimensional space;

means for raster scanning the storage locations of said memory on a time-division-multiplex basis at successively lower spatial frequencies in each dimension of space to generate a number n at least three of consecutively ordinally numbered memory output signals;

a number n of convolvers consecutively ordinally numbered, respectively connected to convolve a generator pattern with the memory output signal having the same ordinal number as its own;

means for adjusting the spatial frequency phases, as referred to said first convolver convolution result, the convolution results of each of the other convolvers second through $n^{th}$; and means for expanding through interpolation each of the phase-adjusted respective convolution results from the second through $n^{th}$ convolvers to the same sampling density as the convolution results from said first convolver and combining the expanded convolution results with each other and the convolution results from said first convolver, thereby to generate a fractal exhibiting variation in amplitude.

51. A fractal generator as set forth in claim 50, arranged for generating animated fractals by including:

means for changing, between successive field scans, the spatial offsets of the raster scannings at successively lower spatial frequencies; and means, within said means for adjusting the spatial frequency phases, for making such adjustments between successive field scans.

52. Video signal generating apparatus comprising at least one fractal generator as set forth in claim 51 in combination with:

means responsive, at least at selected times, to different amplitudes of the fractal generated by each said at least one fractal generator for generating different color video signals.

53. Video signals generating apparatus comprising at least one fractal generator as set forth in claim 51 in combination with:

means responsive, at least at selected times, to different amplitudes of the fractal generated by each said at least one fractal generator for generating different intensity video signals.

54. Video signal generating apparatus comprising at least one fractal generator as set forth in claim 50 in combination with:

means responsive, at least at selected times, to different amplitudes of the fractal generated by each said at least one fractal generator for generating different color video signals.

55. Video signal generating apparatus comprising at least one fractal generator as set forth in claim 50 in combination with:

means responsive, at least at selected times, to different amplitudes of the fractal generated by each said at least one fractal generator for generating different intensity video signals.

* * * * *